(12) United States Patent
Reshadi et al.

(10) Patent No.: US 9,898,445 B2
(45) Date of Patent: Feb. 20, 2018

(54) RESOURCE PREFETCHING VIA SANDBOXED EXECUTION

(71) Applicant: QUALCOMM Incorporated, San Diego, CA (US)

(72) Inventors: Mohammad H. Reshadi, Sunnyvale, CA (US); Michael Weber, Campbell, CA (US)

(73) Assignee: QUALCOMM Incorporated, San Diego, CA (US)

( * ) Notice: Subject to any disclaimer, the term of this patent is extended or adjusted under 35 U.S.C. 154(b) by 583 days.

(21) Appl. No.: 13/722,098

(22) Filed: Dec. 20, 2012

(65) Prior Publication Data

US 2014/0053057 A1    Feb. 20, 2014

Related U.S. Application Data

(60) Provisional application No. 61/684,601, filed on Aug. 17, 2012, provisional application No. 61/683,996, filed on Aug. 16, 2012.

(51) Int. Cl.
*G06F 17/22* (2006.01)
*G06F 9/45* (2006.01)
*G06F 17/30* (2006.01)

(52) U.S. Cl.
CPC ........ *G06F 17/2247* (2013.01); *G06F 8/4442* (2013.01); *G06F 17/30902* (2013.01)

(58) Field of Classification Search
CPC .................................................... G06F 17/22
See application file for complete search history.

(56) References Cited

U.S. PATENT DOCUMENTS 6,292,936 B1   9/2001 Wang
6,662,341 B1   12/2003 Cooper et al.
(Continued)

FOREIGN PATENT DOCUMENTS

CN   1465019 A    12/2003
CN   101075236 A   11/2007
(Continued)

OTHER PUBLICATIONS

Sivonen H, "HTML5 Parser", Internet Citation, Mar. 21, 2011 (Mar. 21, 2011), pp. 1-4, XP002679162, Retrieved from the Internet:URL:https://developer.mozilla.org/en/HTML/HTML5/HTML5_Parser [retrieved on Jul. 3, 2012] p. 3, line 38—p. 4, line 14.
(Continued)

*Primary Examiner* — Scott T Baderman
*Assistant Examiner* — Sookil J Lee
(74) *Attorney, Agent, or Firm* — The Marbury Law Group, PLLC

(57) ABSTRACT

The aspects include browser systems and methods of loading/rendering a webpage by preprocessing scripts within the web document (HTML page) in a sandboxed script engine to discover resources not explicitly requested in the web document so such resources can be pre-fetched and downloaded speculatively. The sandboxed execution of scripts and downloading of discovered resources may proceed in parallel with the performance of other browser operations (e.g., HTML parsing) and other resource requests. The sandboxed script engine may be isolated or separated from the other browser components. The sandboxed script engine may operate to speedup the process of identifying resources inconsistent with standard script execution processes.

28 Claims, 16 Drawing Sheets

(56) References Cited

U.S. PATENT DOCUMENTS

| | | | |
|---|---|---|---|
| 7,281,203 B2 | 10/2007 | Gessner | |
| 7,921,353 B1 | 4/2011 | Murray | |
| 8,020,089 B1 | 9/2011 | Brichford et al. | |
| 8,037,084 B2 | 10/2011 | Kim et al. | |
| 8,108,377 B2 | 1/2012 | Jiang et al. | |
| 8,117,531 B1 | 2/2012 | Lueck | |
| 8,136,089 B2 | 3/2012 | Snodgrass et al. | |
| 8,140,967 B2 | 3/2012 | Horiuchi | |
| 8,176,205 B2 | 5/2012 | Sze et al. | |
| 8,176,321 B1 | 5/2012 | Perry et al. | |
| 8,176,416 B1 | 5/2012 | Williams et al. | |
| 8,285,813 B1 | 10/2012 | Colton et al. | |
| 8,341,245 B1* | 12/2012 | Roskind | G06F 17/30902 709/219 |
| 8,375,296 B2 | 2/2013 | Kalasapur et al. | |
| 8,516,360 B2* | 8/2013 | Mondal et al. | 715/234 |
| 8,549,108 B2* | 10/2013 | Kini | H04L 47/803 709/217 |
| 8,752,035 B2 | 6/2014 | Fanning et al. | |
| 8,806,431 B1 | 8/2014 | Colton et al. | |
| 8,812,658 B1* | 8/2014 | Teeraparpwong | G06F 3/0484 709/203 |
| 8,881,278 B2* | 11/2014 | Kaplan et al. | 726/23 |
| 8,954,492 B1* | 2/2015 | Lowell, Jr. | 709/203 |
| 8,954,989 B1 | 2/2015 | Colton et al. | |
| 8,959,427 B1 | 2/2015 | Carlsson et al. | |
| 8,977,653 B1 | 3/2015 | Mahkovec et al. | |
| 8,984,048 B1* | 3/2015 | Maniscalco | G06F 17/30887 709/201 |
| 9,015,348 B2* | 4/2015 | Hofmann | H04L 67/1095 709/246 |
| 2002/0078165 A1* | 6/2002 | Genty et al. | 709/217 |
| 2004/0015574 A1* | 1/2004 | Meyerson | 709/220 |
| 2004/0088375 A1 | 5/2004 | Sethi et al. | |
| 2004/0098306 A1 | 5/2004 | Fitzpatrick et al. | |
| 2005/0060426 A1 | 3/2005 | Samuels et al. | |
| 2005/0138381 A1 | 6/2005 | Stickle et al. | |
| 2005/0216471 A1 | 9/2005 | Yee et al. | |
| 2005/0273755 A1 | 12/2005 | Bass et al. | |
| 2006/0021029 A1* | 1/2006 | Brickell | G06F 21/51 726/22 |
| 2006/0080646 A1 | 4/2006 | Aman et al. | |
| 2006/0150075 A1 | 7/2006 | Dietl et al. | |
| 2006/0253546 A1 | 11/2006 | Chang et al. | |
| 2007/0061700 A1 | 3/2007 | Kothari et al. | |
| 2007/0136579 A1* | 6/2007 | Levy | H04L 63/102 713/168 |
| 2008/0098300 A1 | 4/2008 | Corrales et al. | |
| 2008/0208789 A1 | 8/2008 | Almog | |
| 2008/0222242 A1 | 9/2008 | Weiss et al. | |
| 2008/0271045 A1* | 10/2008 | Le Roy et al. | 719/311 |
| 2008/0271046 A1* | 10/2008 | Lipton et al. | 719/311 |
| 2008/0313648 A1* | 12/2008 | Wang | G06F 21/53 719/315 |
| 2009/0019105 A1 | 1/2009 | Sebastian | |
| 2009/0019153 A1 | 1/2009 | Sebastian | |
| 2009/0112975 A1* | 4/2009 | Beckman | H04L 67/26 709/203 |
| 2009/0164604 A1* | 6/2009 | Merissert-Coffinteres et al. | 709/218 |
| 2010/0050089 A1 | 2/2010 | Kim et al. | |
| 2010/0115585 A1* | 5/2010 | Cohen | G06F 21/53 726/3 |
| 2010/0149091 A1* | 6/2010 | Kota | G06T 11/00 345/156 |
| 2010/0175049 A1 | 7/2010 | Ramsey et al. | |
| 2010/0180192 A1 | 7/2010 | Hall | |
| 2010/0281537 A1* | 11/2010 | Wang | G06F 9/468 726/22 |
| 2010/0312858 A1 | 12/2010 | Mickens et al. | |
| 2011/0010690 A1 | 1/2011 | Howard et al. | |
| 2011/0029967 A1* | 2/2011 | Berg et al. | 717/175 |
| 2011/0066676 A1 | 3/2011 | Kleyzit et al. | |
| 2011/0066732 A1 | 3/2011 | Iwade et al. | |
| 2011/0082984 A1 | 4/2011 | Yuan | |
| 2011/0099629 A1* | 4/2011 | Boesgaard | 726/22 |
| 2011/0145287 A1* | 6/2011 | Jiang | G06F 17/30905 707/780 |
| 2011/0145321 A1* | 6/2011 | Jiang | G06F 17/30902 709/203 |
| 2011/0173597 A1 | 7/2011 | Cascaval et al. | |
| 2011/0185271 A1 | 7/2011 | Aciicmez et al. | |
| 2011/0197177 A1 | 8/2011 | Mony | |
| 2011/0246781 A1 | 10/2011 | Morita et al. | |
| 2011/0282940 A1 | 11/2011 | Zhang et al. | |
| 2011/0283363 A1* | 11/2011 | Verschoor et al. | 726/26 |
| 2011/0289484 A1* | 11/2011 | Caine | G06F 8/30 717/127 |
| 2011/0307951 A1 | 12/2011 | Yermakov et al. | |
| 2011/0307955 A1 | 12/2011 | Kaplan et al. | |
| 2012/0030305 A1* | 2/2012 | Marquess | G06F 17/30861 709/213 |
| 2012/0041752 A1* | 2/2012 | Wang | G06F 3/018 704/2 |
| 2012/0079057 A1* | 3/2012 | Fainberg | G06F 17/30902 709/214 |
| 2012/0110433 A1* | 5/2012 | Pan et al. | 715/234 |
| 2012/0110437 A1* | 5/2012 | Pan et al. | 715/235 |
| 2012/0159311 A1 | 6/2012 | Hanssen et al. | |
| 2012/0159439 A1* | 6/2012 | Kaplinger | G06F 8/71 717/121 |
| 2012/0222134 A1 | 8/2012 | Orsini et al. | |
| 2012/0239598 A1* | 9/2012 | Cascaval et al. | 706/12 |
| 2012/0246017 A1* | 9/2012 | Kleber | 705/14.73 |
| 2012/0260181 A1 | 10/2012 | Sule et al. | |
| 2012/0290924 A1* | 11/2012 | Vick et al. | 715/237 |
| 2012/0324582 A1* | 12/2012 | Park | 726/25 |
| 2013/0042004 A1* | 2/2013 | Boss | G06F 9/5061 709/226 |
| 2013/0174016 A1* | 7/2013 | Glazer et al. | 715/234 |
| 2013/0212462 A1 | 8/2013 | Athas et al. | |
| 2013/0227388 A1 | 8/2013 | Trunley et al. | |
| 2013/0227691 A1* | 8/2013 | Aziz | G06F 21/567 726/24 |
| 2013/0326022 A1* | 12/2013 | Ehrlich et al. | 709/219 |
| 2014/0012963 A1* | 1/2014 | Swenson | H04L 41/0813 709/220 |
| 2014/0033019 A1* | 1/2014 | Zhang et al. | 715/234 |
| 2014/0053056 A1 | 2/2014 | Weber et al. | |
| 2014/0053058 A1 | 2/2014 | Weber et al. | |
| 2014/0053059 A1 | 2/2014 | Weber et al. | |
| 2014/0053063 A1 | 2/2014 | Cirrincione et al. | |
| 2014/0053064 A1 | 2/2014 | Weber et al. | |
| 2014/0089472 A1 | 3/2014 | Tessler | |
| 2014/0365861 A1* | 12/2014 | Lasmarias | G06F 9/54 715/234 |
| 2015/0127771 A1* | 5/2015 | Bauer-Hermann | H04L 67/22 709/217 |

FOREIGN PATENT DOCUMENTS

| | | |
|---|---|---|
| CN | 102438045 A | 5/2012 |
| JP | 2013514594 A | 4/2013 |
| WO | WO-0152061 A2 | 7/2001 |
| WO | WO-02057909 A2 | 7/2002 |
| WO | WO-03041328 A2 | 5/2003 |
| WO | 2006119465 A2 | 11/2006 |
| WO | 2011084431 A2 | 7/2011 |

OTHER PUBLICATIONS

Sivonen H, "Speculative HTML Tree Building", Internet Citation, Mar. 11, 2009 (Mar. 11, 2009), pp. 1-3, XP002679153, Retrieved from the Internet: URL:http://groups.google.com/group/mozilla.dev.piatform/msg/5f0e803711e04aef?dmode=source [retrieved on Jul. 3, 2012].

International Search Report and Written Opinion—PCT/US2013/045693—ISA/EPO—Oct. 4, 2013.

Sathiyamoorthi V., et al., "Data Preprocessing Techniques for Pre-Fetching and Caching of Web Data Through Proxy Server,"

(56) References Cited

OTHER PUBLICATIONS

International Journal of Computer Science and Network Security, 2011, pp. 92-98, vol. 11 (11).
Armstrong, Nicholas D.R., "Just-In-Time Push Prefetching: Accelerating the Mobile Web," Thesis, Univ. Waterloo, Ontario, 2011.
Taiwan Search Report—TW102122788—TIPO—Mar. 16, 2015.

* cited by examiner

US 9,898,445 B2

RESOURCE PREFETCHING VIA SANDBOXED EXECUTION

CROSS REFERENCE TO RELATED PATENT APPLICATIONS

This application claims the benefit of priority to U.S. Provisional Patent Application Ser. No. 61/684,601 entitled "Speculative Resource Prefetching via Sandboxed Execution" filed Aug. 17, 2012 and U.S. Provisional Patent Application Ser. No. 61/683,996 entitled "Speculative Resource Prefetching via Sandboxed Execution" filed Aug. 16, 2012, the entire contents of both of which are hereby incorporated by reference.

This application is also related to U.S. patent application Ser. No. 13/722,066 entitled "Pre-Processing of Scripts in Web Browsers" filed concurrently with this application.

This application is also related to U.S. patent application Ser. No. 13/722,048 entitled "Predicting the Usage of Document Resources" filed concurrently with this application.

FIELD OF THE INVENTION

The present invention relates to methods, systems, and devices for rendering HTML documents in a web browser, and more particularly to methods of parallelizing web browser operations.

BACKGROUND

Wireless communication technologies and mobile electronic devices (e.g., cellular phones, tablets, laptops, etc.) have grown in popularity and use over the past several years. To keep pace with increased consumer demands, mobile electronic devices have become more feature rich, and now commonly include multiple processors, system-on-chips (SoCs), and other resources that allow mobile device users to execute complex and power intensive software applications (e.g., web browsers, video streaming applications, etc.) on their mobile devices. Due to these and other improvements, smartphones and tablet computers have grown in popularity, and are replacing laptops and desktop machines as the platform of choice for many users.

Mobile device users can now accomplish many of their daily tasks with ease and convenience by accessing the Internet via browser applications on their mobile device. As mobile devices continue to grow in popularity, web browsers that are able to better utilize the multiprocessing capabilities of the modern mobile devices will be desirable to consumers.

SUMMARY

The various aspects include methods of pre-fetching resources, including scanning an HTML document to discover a script by a first process executing in a processor of a computing device, speculatively executing the discovered script by a second process to discover resources not expressly referenced in the script or the HTML document, speculatively pre-fetching resources by issuing a request to download the discovered resources, and discarding results generated by speculatively executing the discovered script. In an aspect, speculatively executing the discovered script to discover resources not expressly referenced in the script or the HTML document may include speculatively executing the discovered script to discover a resource that is required to render the HTML document on an electronic display of the computing device. In a further aspect, speculatively executing the discovered script may include speculatively executing the discovered script in parallel with an execution of browser operations. In a further aspect, speculatively executing the discovered script may include executing the discovered script in parallel with executing other scripts and concurrent with an execution of browser operations.

In a further aspect, speculatively pre-fetching resources may include pre-fetching resources in parallel with executing other scripts and concurrent with an execution of browser operations. In a further aspect, speculatively executing the discovered script may include executing select portions of the discovered script determined to be most likely to be relevant to discovering external resources. In a further aspect, speculatively executing the discovered script may include executing only portions of the discovered script that correspond to a pattern identified as being relevant to discovering external resources.

In a further aspect, speculatively executing the discovered script in parallel may include executing the discovered script based on heuristics. In a further aspect, the method may include limiting a size of data structures generated from the speculative execution of the discovered script. In a further aspect, scanning an HTML document to discover a script by a first process may include scanning the HTML document by an HTML scanner, and speculatively executing the discovered script by a second process may include speculatively executing the discovered script by a sandboxed script execution engine.

Further aspects include a computing device that may include means for scanning an HTML document to discover a script by a first process, means for speculatively executing the discovered script by a second process to discover resources not expressly referenced in the script or the HTML document, means for speculatively pre-fetching resources by issuing a request to download the discovered resources, and means for discarding results generated by speculatively executing the discovered script. In an aspect, means for speculatively executing the discovered script to discover resources not expressly referenced in the script or the HTML document may include means for speculatively executing the discovered script to discover a resource that is required to render the HTML document on an electronic display of the computing device.

In a further aspect, means for speculatively executing the discovered script may include means for speculatively executing the discovered script in parallel with an execution of browser operations. In a further aspect, means for speculatively executing the discovered script may include means for executing the discovered script in parallel with executing other scripts, and concurrent with an execution of browser operations. In a further aspect, means for speculatively pre-fetching resources may include means for pre-fetching resources in parallel with executing other scripts and concurrent with an execution of browser operations. In a further aspect, means for speculatively executing the discovered script may include means for executing select portions of the discovered script determined to be most likely to be relevant to discovering external resources.

In a further aspect, means for speculatively executing the discovered script may include means for executing only portions of the discovered script that correspond to a pattern identified as being relevant to discovering external resources. In a further aspect, means for speculatively executing the discovered script in parallel may include means for executing the discovered script based on heuristics. In a further aspect, the computing device may include means for limiting a size of data structures generated from the speculative execution of the discovered script. In a further aspect, means for scanning an HTML document to discover a script by a first process may include means for scanning the HTML document by an HTML scanner, and means for speculatively executing the discovered script by a second process may include means for speculatively executing the discovered script by a sandboxed script execution engine.

Further aspects include a computing device, including a processor configured with processor-executable instructions to perform operations including scanning an HTML document to discover a script by a first process, speculatively executing the discovered script by a second process to discover resources not expressly referenced in the script or the HTML document, speculatively pre-fetching resources by issuing a request to download the discovered resources, and discarding results generated by speculatively executing the discovered script. In an aspect, the processor may be configured with processor-executable instructions to perform operations such that speculatively executing the discovered script to discover resources not expressly referenced in the script or the HTML document may include speculatively executing the discovered script to discover a resource that is required to render the HTML document on an electronic display of the computing device.

In a further aspect, the processor may be configured with processor-executable instructions to perform operations such that speculatively executing the discovered script may include speculatively executing the discovered script in parallel with an execution of browser operations. In a further aspect, the processor may be configured with processor-executable instructions to perform operations such that speculatively executing the discovered script may include executing the discovered script in parallel with executing other scripts, and concurrent with an execution of browser operations. In a further aspect, the processor may be configured with processor-executable instructions to perform operations such that speculatively pre-fetching resources may include pre-fetching resources in parallel with executing other scripts and concurrent with an execution of browser operations.

In a further aspect, the processor may be configured with processor-executable instructions to perform operations such that speculatively executing the discovered script may include executing select portions of the discovered script determined to be most likely to be relevant to discovering external resources. In a further aspect, the processor may be configured with processor-executable instructions to perform operations such that speculatively executing the discovered script may include executing only portions of the discovered script that correspond to a pattern identified as being relevant to discovering external resources. In a further aspect, the processor may be configured with processor-executable instructions to perform operations such that speculatively executing the discovered script in parallel may include executing the discovered script based on heuristics.

In a further aspect, the processor may be configured with processor-executable instructions to perform operations further including limiting a size of data structures generated from the speculative execution of the discovered script. In a further aspect, the processor may be configured with processor-executable instructions to perform operations such that scanning an HTML document to discover a script by a first process may include scanning the HTML document by an HTML scanner, and speculatively executing the discovered script by a second process may include speculatively executing the discovered script by a sandboxed script execution engine.

Further aspects include a non-transitory computer readable storage medium having stored thereon processor-executable software instructions configured to cause a processor to perform operations for pre-fetching resources, the operations including scanning an HTML document to discover a script by a first process, speculatively executing the discovered script by a second process to discover resources not expressly referenced in the script or the HTML document, speculatively pre-fetching resources by issuing a request to download the discovered resources, and discarding results generated by speculatively executing the discovered script.

In an aspect, the stored processor-executable software instructions may be configured to cause a processor to perform operations such that speculatively executing the discovered script to discover resources not expressly referenced in the script or the HTML document may include speculatively executing the discovered script to discover a resource that is required to render the HTML document on an electronic display. In a further aspect, the stored processor-executable software instructions may be configured to cause a processor to perform operations such that speculatively executing the discovered script may include speculatively executing the discovered script in parallel with an execution of browser operations. In a further aspect, the stored processor-executable software instructions may be configured to cause a processor to perform operations such that speculatively executing the discovered script may include executing the discovered script in parallel with executing other scripts, and concurrent with an execution of browser operations.

In a further aspect, the stored processor-executable software instructions may be configured to cause a processor to perform operations such that speculatively pre-fetching resources may include pre-fetching resources in parallel with executing other scripts and concurrent with an execution of browser operations. In a further aspect, the stored processor-executable software instructions may be configured to cause a processor to perform operations such that speculatively executing the discovered script may include executing select portions of the discovered script determined to be most likely to be relevant to discovering external resources. In a further aspect, the stored processor-executable software instructions may be configured to cause a processor to perform operations such that speculatively executing the discovered script may include executing only portions of the discovered script that correspond to a pattern identified as being relevant to discovering external resources.

In a further aspect, the stored processor-executable software instructions may be configured to cause a processor to perform operations such that speculatively executing the discovered script in parallel may include executing the discovered script based on heuristics. In a further aspect, the stored processor-executable software instructions may be configured to cause a processor to perform operations further including limiting a size of data structures generated from the speculative execution of the discovered script. In a further aspect, the stored processor-executable software instructions may be configured to cause a processor to perform operations such that scanning an HTML document to discover a script by a first process may include scanning the HTML document by an HTML scanner, and speculatively executing the discovered script by a second process may include speculatively executing the discovered script by a sandboxed script execution engine.

BRIEF DESCRIPTION OF THE DRAWINGS

The accompanying drawings, which are incorporated herein and constitute part of this specification, illustrate exemplary aspects of the invention. Together with the general description given above and the detailed description given below, the drawings serve to explain features of the invention not to limit the disclosed aspects.

DETAILED DESCRIPTION

Figure 1:
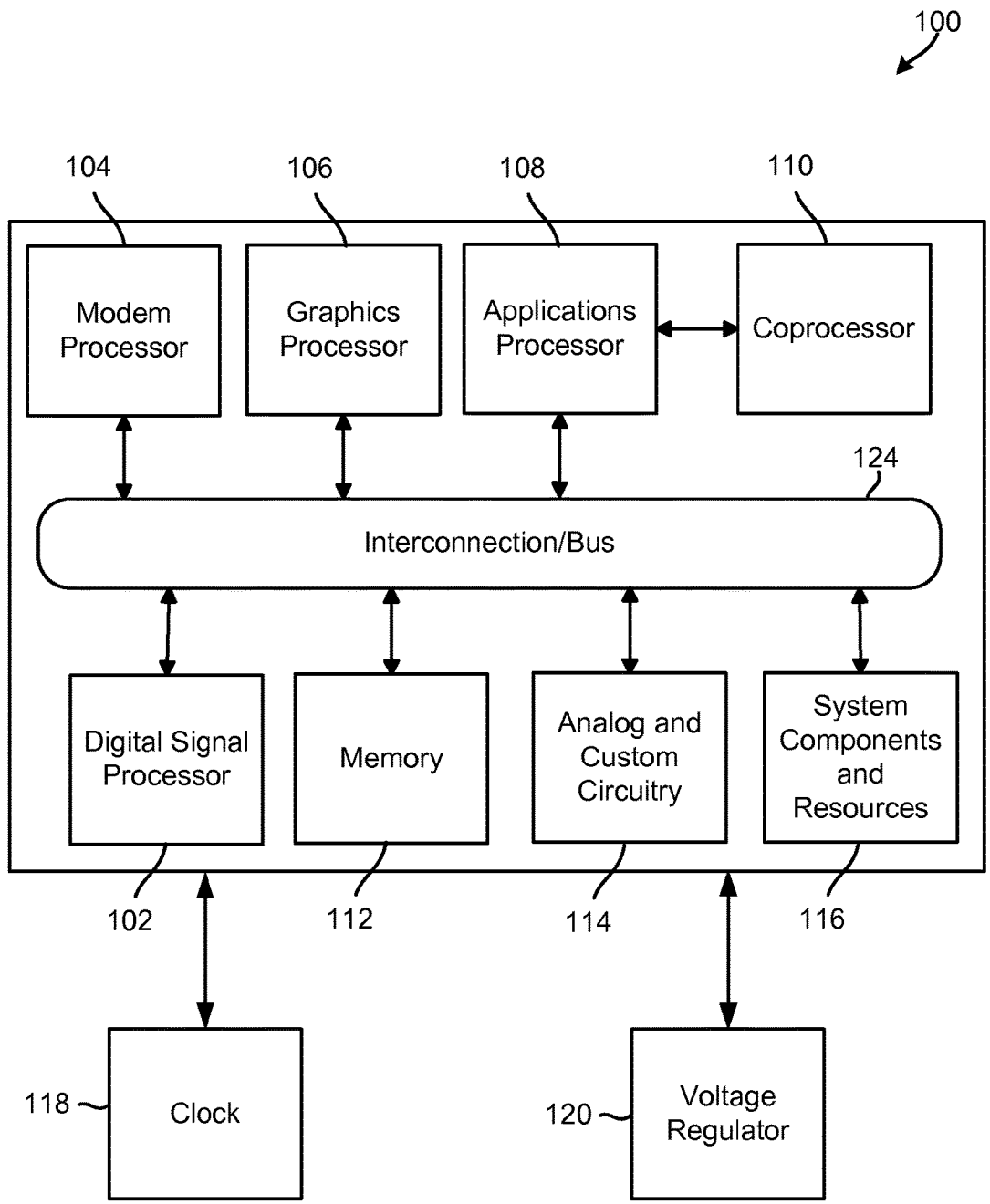
FIG. 1 is a component block diagram illustrating an example system-on-chip (SOC) architecture that may be used in computing devices implementing the various aspects.

The various aspects will be described in detail with reference to the accompanying drawings. Wherever possible, the same reference numbers will be used throughout the drawings to refer to the same or like parts. References made to particular examples and implementations are for illustrative purposes and are not intended to limit the scope of the invention or the claims.

Web browsers are complex software applications that implement multiple standards, need to support legacy behavior, and are highly dynamic and interactive. Web browser designers generally aim to achieve an optimal mix of fast response times for page loads (even in the presence of long network latencies), high performance (e.g., to enable interactivity for web applications), and high user interface responsiveness to provide a good user experience.

The various aspects provide web browsers, browser methods, and browser systems configured to achieve fast response times, high performance, and high user interface responsiveness via the use of speculative resource pre-fetching by exploiting concurrency/parallelism enabled by modern multiprocessor mobile device architectures using sandboxed execution of processes.

Modern web documents (e.g., HTML pages, HTML documents, etc.) may reference a large number of external resources, and each referenced external resource may include references to other external resources. For example, HTML documents typically include references to images, audio, Cascading Style Sheets (CSS), and JavaScript®, and the referenced resources (e.g., CSS, audio, JavaScript®) may further include references to additional external resources (e.g., images, audio, etc.). Typically, not all of the referenced external resources are required (or even used) to properly render the webpage on an electronic display of a mobile device.

Software developers are increasingly using scripts (e.g., Javascript Code®) to dynamically determine the resources that are going to be required for a particular application-device combination (e.g., web browser-mobile device combination). For example, scripts may evaluate various factors relating to a client application (e.g., browser) and computing device to identify the resources that are to be downloaded. Such scripts may essentially build a URL dynamically for a resource (e.g., images, CSS, other JavaScript®, etc.) based on the evaluated factors. Thus, an HTML document may require resources that are not explicitly identified in the HTML document, and which may only be determined by executing JavaScript® code included in the HTML document.

JavaScript® code may change the state, behavior, and/or presentation of its containing HTML (and the HTML code itself), and an HTML parser is generally required to execute the encountered JavaScript® code (or scripts) sequentially and/or by following ordering rules defined in the HTML specifications. For example, when an HTML parser encounters a script tag (i.e., a <script> tag used to define a client-side script, such as a JavaScript® script), the HTML parser has to wait for the script to be downloaded and executed before it may continue parsing the remaining portions of the HTML document. As a result, all resource requests may be serialized (i.e., required to be performed one after the other) within the execution of the JavaScript® script (i.e., JavaScript® code inside <script> tags). Also, it may be more difficult for the HTML document scanning operations to statically predict the resources that are going to be required for proper rendering the webpage.

Various aspects include methods and browsers that overcome these and other limitations of existing solutions by speculatively pre-fetching resources in a sandboxed JavaScript® engine to discover and download resources that not explicitly requested in the HTML document. The downloading of resources may be performed in parallel with the performance of other browser operations (e.g., HTML parsing) and other resource requests.

In an aspect, the sandboxed JavaScript® engine may scan through the JavaScript code and execute only select portions of code and/or select operations most relevant to discovering external resources. Since this sandboxed execution and scanning operation is only concerned with discovering resources that the script may request when executed to generate the webpage, the scanning operation is not bound by the HTML specification rules, and does not have to run/execute all of the encountered code. Further, by not fully executing all of the encountered code, the JavaScript scanning operations may be performed quickly by the sandboxed JavaScript® engine.

In an aspect, the sandboxed JavaScript® engine may apply heuristics to further speedup the JavaScript scanning operations. By way of example, such heuristics may include limiting the total execution time (e.g., spend a maximum of 10 ms per script or operation, etc.), the number of loop iterations (e.g., only process the first 10 iterations of a loop, etc.), the recursion depth, the supported features, abstract interpretation, etc.

Various aspect methods and browsers may modify an application programming interface (API) between a browser client and the JavaScript® engine. Generally, scripting engines (e.g., JavaScript® engine) provide bindings (i.e., API for mapping languages) to the browser API (i.e., interface that enables the scripts to invoke browser operations) to invoke browser operations (e.g., manipulating DOM, accessing network, etc.). Various aspects may monitor browser API resource requests, and modify the bindings (or provide a separate set of bindings for the scripting engine) to cause the resource requests to be redirected to a different browser component (e.g., a pre-fetcher component). In this manner, the resource requests and/or collected information may be passed directly to the browser component (pre-fetcher) for further processing.

The word "exemplary" is used herein to mean "serving as an example, instance, or illustration." Any implementation described herein as "exemplary" is not necessarily to be construed as preferred or advantageous over other implementations.

The terms "mobile device," and "computing device" are used interchangeably herein to refer to any one or all of cellular telephones, smartphones, personal or mobile multi-media players, personal data assistants (PDA's), laptop computers, tablet computers, smartbooks, palm-top computers, wireless electronic mail receivers, multimedia Internet enabled cellular telephones, wireless gaming controllers, and similar personal electronic devices which include a programmable processor and a memory. While the various aspects are particularly useful in mobile devices, such as cellular telephones, which may have limited processing power, the aspects are generally useful in any computing device that executes scripts and/or applications written in dynamic, scripting and/or markup languages.

The term "system on chip" (SOC) is used herein to refer to a single integrated circuit (IC) chip that contains multiple resources and/or processors integrated on a single substrate. A single SOC may contain circuitry for digital, analog, mixed-signal, and radio-frequency functions. A single SOC may also include any number of general purpose and/or specialized processors (digital signal processors, modem processors, video processors, etc.), memory blocks (e.g., ROM, RAM, Flash, etc.), and resources (e.g., timers, voltage regulators, oscillators, etc.). SOCs may also include software for controlling the integrated resources and processors, as well as for controlling peripheral devices.

The term "multicore processor" is used herein to refer to a single integrated circuit (IC) chip or chip package that contains two or more independent processing cores (e.g., CPU cores) configured to read and execute program instructions. A SOC may include multiple multicore processors, and each processor in an SOC may be referred to as a core. The term "multiprocessor" is used herein to refer to a system or device that includes two or more processing units configured to read and execute program instructions.

As used in this application, the terms "component," "module," "system," "engine," "manager," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a computing device and the computing device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known computer, processor, and/or process related communication methodologies.

The term "application programming interface" and its acronym "API" are used generically in this application to refer to any software interface that may be used by a first software component to communicate with a second software component. An API may include specifications for routines, procedures, functions, methods, data structures, object classes, and variables. An API may also include facilities for mapping the API to features (syntactic or semantic) of another high-level programming language. Such facilities and/or mappings may themselves be APIs, and are known as "language bindings" or "bindings."

The term "markup language" is used generically in this application to refer to any programming language and/or system for annotating text such that a processor may syntactically distinguish the annotations from the text. Examples of markup languages include Scribe, Standard Generalized Markup Language (SGML), Hyper-Text Markup Language (HTML), Extensible Markup Language (XML), and Extensible Hyper-Text Markup Language (XHTML).

The terms "dynamic language" and "scripting language" are used generically and interchangeably in this application to refer to any dynamic language, scripting language, or to any language used to write programs (herein as "scripts") that are interpreted and/or compiled at runtime. These terms may also refer to any language that runs on a managed runtime and is dynamically compiled. Thus, for the purposes of this application, usage of the terms "dynamic language" and "scripting language" in the description of the various aspects should not be construed as limiting the claims to languages that are interpreted from source code or bytecode, or to those that execute along with programs that are traditionally compiled into native machine code. Examples of dynamic and scripting languages within the scope of this application include, for example, JavaScript®, Perl, Python, and Ruby, as well as other similar languages that may be developed in the future.

The terms "style sheet language" and "style language" are used generically in this application to refer to any computer language that expresses the presentation of structured documents so that the presentation style of the document may be separated from the content of the document. An example of a style sheet language is Cascading Style Sheets (CSS), which is typically used for describing the presentation semantics of a document written in a markup language.

For ease of reference, throughout this application, HTML is used as an exemplary markup language, CSS is used as an exemplary style sheet language, and JavaScript® is used as an exemplary dynamic scripting language. However, it should be noted that the use of HTML, CSS, and JavaScript® in this application is only for purposes of illustration, and should not be construed to limit the scope of the claims to a particular language unless expressly recited by the claims.

HTML is a markup language that implements the ISO/IEC 15445 standard. HTML may be characterized as a set of markup tags (e.g., annotations) used to describe web pages so that they can be displayed by a software application, such as a web browser. HTML allows for the creation of structured documents by denoting structural semantics for text, such as headings, paragraphs, lists, links, quotes, and other items.

JavaScript® is a dynamic, weakly typed, object-oriented scripting language that implements the ECMAScript language standard (standardized by ECMA International in the ECMA-262 specification) and/or the ISO/IEC 16262 standard. JavaScript® enables programmatic access to computational objects within a host environment, such as web browsers executing on a mobile device processor.

Cascading Style Sheets (CSS) is a style language used to describe the look and formatting of web sites, and is intended to be used to separate the presentation of a document from its content. Each style sheet may include an ordered collection of rules with the following format: selector {property$_1$: value; . . . property$_n$: value;}. As an example, the following CSS code tells the browser to render all <cite> elements whose direct ancestor is a <p> element using a white foreground over a red background: p>cite {color: white; background-color: red;}. It is not uncommon for websites to include tens of thousand of such rules.

HTML may embed and/or include links to JavaScript® code capable of affecting the behavior and/or presentation of the containing HTML page. The embedded/linked JavaScript® code may also generate additional HTML code, which can be inserted into the containing HTML page (i.e., the HTML code in which the JavaScript® is embedded). JavaScript® may be used to embed functions into HTML code such that the functions interact with, and manipulate, the document object model (DOM) of the HTML page. DOM is a language-independent convention for representing and interacting with objects in HTML, and allows the JavaScript® code to have access to, and manipulate, the containing HTML page. A DOM tree is typically generated as part of rendering a web page to identify the components, relative structure, relationships, and behavior of the respective components that define the page.

HTML can include (e.g., embed and/or link to) CSS code. CSS code specified as separate files may be stored on remote servers. Conventional CSS processing engines (e.g., WebKit or Firefox) parse CSS sequentially in the main browser thread and do not support a high degree of parallelism or concurrency. For example, when CSS code is embedded into the HTML document, an HTML parser cannot parse remaining portions of an HTML document until the CSS engine has parsed the style elements in the HTML document's header. When an HTML document includes links to several CSS files, conventional CSS processing engines will parse all the linked CSS files sequentially. For these and other reasons, conventional CSS processing engines may cause severe slowdowns, especially in the case of large CSS files (which is common).

The various aspect methods and browsers take advantage of the parallelism available in modern mobile devices to improve the efficiency and speed of page-loads, web applications, and network communications.

Various aspects may include browser methods of loading/rendering a webpage by preprocessing the web document (HTML page) using speculation/prediction techniques to identify the resources that are likely to be required from an incomplete set of information, and requesting/pre-fetching the resources that are determined to have a high probability of being required for proper rendering of the web document. Pre-fetching of these resources may enable the web browser (and thus the mobile device) to better utilize the available bandwidth, overlap the transfer latencies, and improve document load times.

In recent years, mobile electronic devices (e.g., cellular phones, tablets, laptops, etc.) have become more feature rich, and now commonly include multiple processors, system-on-chips (SoCs), multiple memories, and other resources that allow mobile device users to execute complex and power intensive software applications (e.g., web browsers, video streaming applications, etc.) on their mobile devices. Due to these and other improvements, smartphones and tablet computers have grown in popularity, and are replacing laptops and desktop machines as the platform of choice for many users. Mobile device users can now accomplish many their daily tasks with ease and convenience by accessing the Internet via a web browser of their mobile device.

The various aspects provide browser methods and/or web browsers configured to achieve fast response times, high performance, and high user interface responsiveness by exploiting the concurrency/parallelism enabled by fast processors and multiprocessor mobile device architectures, as well as use of speculative processing and pre-fetching of resources, thereby hiding network latency and improving the overall user experience.

Web browsers are complex applications that implement multiple standards, need to support legacy behavior, and are highly dynamic and interactive. Web browser designers generally aim to achieve an optimal mix of fast response times for page loads (even in the presence of long network latencies), high performance (e.g., to enable interactivity for web applications), and high user interface responsiveness (e.g., to provide a good user experience).

Exploiting concurrency in web browsers is a relatively new approach. Most existing browsers (e.g., Firefox and the WebKit based Chrome and Safari browsers), are fundamentally architected as sequential engines, using event driven models to help with interactivity. Due to the large number of dependencies between mobile device and/or browser subsystems (and because many existing data structures aren't thread safe) these existing solutions do not support a high degree of parallelism or concurrency.

Chrome and the WebKit2 generate separate processes for each browser tab, which provides some isolation between different web sites, but delegates the responsibility of using multiple cores to the operating system. In addition, these processes are heavyweight in terms of both memory and startup overhead. As such, these solutions do not speed up individual page loads or improve the efficiency of network communications, but simply support parallelism with respect to executing multiple instances of the same application. Such tab-level parallelism does not address the needs of mobile browsers, where single-tab performance is often inadequate and users do not open many tabs at once.

The OP and OP2 browsers may generate a new collection of processes per web page (called a "web instance"), and browser components (e.g., networking) may run in different processes. However, these solutions, like all other existing browser solutions, are still inherently sequential. For example, while a network operation may be performed in a separate process as a parse operation, the network process must still wait on a parse process (and vice versa) because each operation is dependent on the other. That is, while OP and OP2 browsers allow for the use of multiple processes or threads, these solutions do not achieve a high degree of parallelism in rendering a webpage because they do not address the serial/sequential nature of browser processing algorithms for downloading, processing, and rendering webpages.

The various aspects include a high-performance web browser configured to overcome the serial/sequential nature of existing browser processing algorithms, utilize the multi-thread execution and parallel processing capabilities of high-speed processors and multiprocessor mobile device architectures, and exploit parallelism pervasively to improve browser performance, reduce network latency, and improve the user experience for users of mobile devices.

The various aspects may be implemented on a number of single processor and multiprocessor computer systems, including a system-on-chip (SOC). FIG. 1 illustrates an example system-on-chip (SOC) 100 architecture that may be used in computing devices implementing the various aspects. The SOC 100 may include a number of heterogeneous processors, such as a digital signal processor (DSP) 102, a modem processor 104, a graphics processor 106, and an application processor 108. The SOC 100 may also include one or more coprocessors 110 (e.g., vector coprocessor) connected to one or more of the heterogeneous processors 102, 104, 106, 108. Each processor 102, 104, 106, 108, 110 may include one or more cores, and each processor/core may perform operations independent of the other processors/cores. For example, the SOC 100 may include a processor that executes a first type of operating system (e.g., FreeBSD, Linux, MacOS X, etc.) and a processor that executes a second type of operating system (e.g., Microsoft Windows 8).

The SOC 100 may also include analog circuitry and custom circuitry 114 for managing sensor data, analog-to-digital conversions, wireless data transmissions, and for performing other specialized operations, such as processing encoded audio and video signals for rendering in a web browser. The SOC 100 may further include system components and resources 116, such as voltage regulators, oscillators, phase-locked loops, peripheral bridges, data controllers, memory controllers, system controllers, access ports, timers, and other similar components used to support the processors and software clients (e.g., a web browser) running on a computing device.

The system components and resources 116 and/or custom circuitry 114 may include circuitry to interface with peripheral devices, such as cameras, electronic displays, wireless communication devices, external memory chips, etc. The processors 102, 104, 106, 108 may be interconnected to one or more memory elements 112, system components and resources 116, and custom circuitry 114 via an interconnection/bus module 124, which may include an array of reconfigurable logic gates and/or implement a bus architecture (e.g., CoreConnect, AMBA, etc.). Communications may be provided by advanced interconnects, such as high performance networks-on chip (NoCs).

The SOC 100 may further include an input/output module (not illustrated) for communicating with resources external to the SOC, such as a clock 118 and a voltage regulator 120. Resources external to the SOC (e.g., clock 118, voltage regulator 120) may be shared by two or more of the internal SOC processors/cores (e.g., a DSP 102, a modem processor 104, a graphics processor 106, an applications processor 108, etc.).

In addition to the SOC 100 discussed above, the various aspects may be implemented in a wide variety of computing systems, which may include a single processor, multiple processors, multicore processors, or any combination thereof.

Figure 2:
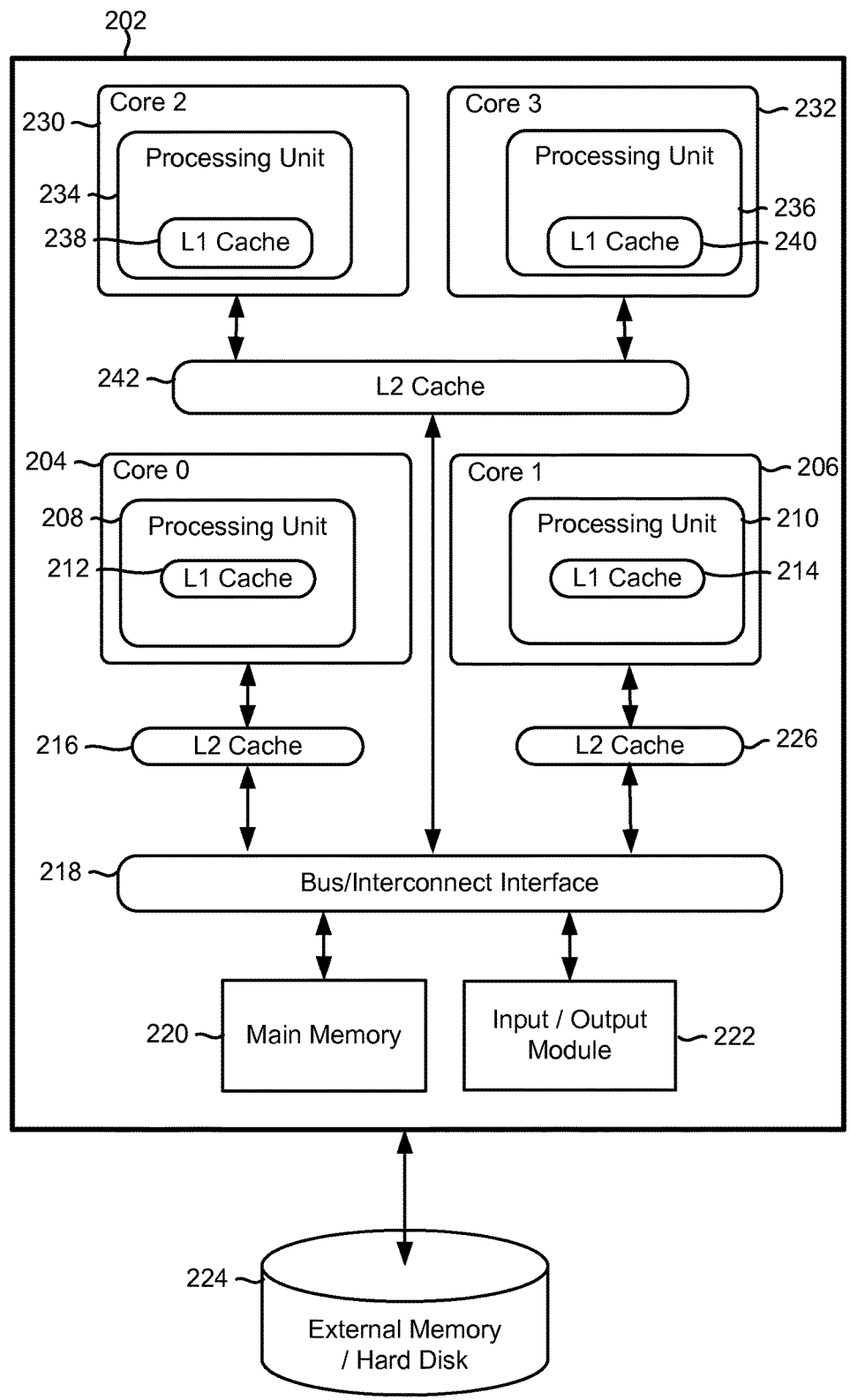
FIG. 2 is a function block diagram illustrating an example multicore processor architecture that may be used to implement the various aspects.

FIG. 2 illustrates an example multicore processor architecture that may be used to implement the various aspects. The multicore processor 202 may include two or more independent processing cores 204, 206, 230, 232 in close proximity (e.g., on a single substrate, die, integrated chip, etc.). The proximity of the processing cores 204, 206, 230, 232 allows memory to operate at a much higher frequency/clock-rate than is possible if the signals have to travel off-chip. Moreover, the proximity of the processing cores 204, 206, 230, 232 allows for the sharing of on-chip memory and resources (e.g., voltage rail), as well as for more coordinated cooperation between cores.

The multicore processor 202 may include a multi-level cache that includes Level 1 (L1) caches 212, 214, 238, 240 and Level 2 (L2) caches 216, 226, 242. The multicore processor 202 may also include a bus/interconnect interface 218, a main memory 220, and an input/output module 222. The L2 caches 216, 226, 242 may be larger (and slower) than the L1 caches 212, 214, 238, 240, but smaller (and substantially faster) than a main memory unit 220. Each processing core 204, 206, 230, 232 may include a processing unit 208, 210, 234, 236 that has private access to an L1 cache 212, 214, 238, 240. The processing cores 204, 206, 230, 232 may share access to an L2 cache (e.g., L2 cache 242) or may have access to an independent L2 cache (e.g., L2 cache 216, 226).

The L1 and L2 caches may be used to store data frequently accessed by the processing units, whereas the main memory 220 may be used to store larger files and data units being accessed by the processing cores 204, 206, 230, 232. The multicore processor 202 may be configured so that the processing cores 204, 206, 230, 232 seek data from memory in order, first querying the L1 cache, then L2 cache, and then the main memory if the information is not stored in the caches. If the information is not stored in the caches or the main memory 220, multicore processor 202 may seek information from an external memory and/or a hard disk memory 224.

The processing cores 204, 206, 230, 232 may communicate with each other via the bus/interconnect interface 218. Each processing core 204, 206, 230, 232 may have exclusive control over some resources and share other resources with the other cores.

The processing cores 204, 206, 230, 232 may be identical to one another, be heterogeneous, and/or implement different specialized functions. Thus, processing cores 204, 206, 230, 232 need not be symmetric, either from the operating system perspective (e.g., may execute different operating systems) or from the hardware perspective (e.g., may implement different instruction sets/architectures).

Multiprocessor hardware designs, such as those discussed above with reference to FIGS. 1 and 2, may include multiple processing cores of different capabilities inside the same package, often on the same piece of silicon. Symmetric multiprocessing hardware includes two or more identical processors connected to a single shared main memory that are controlled by a single operating system. Asymmetric or "loosely-coupled" multiprocessing hardware may include two or more heterogeneous processors/cores that may each be controlled by an independent operating system and connected to one or more shared memories/resources.

Figure 3A:
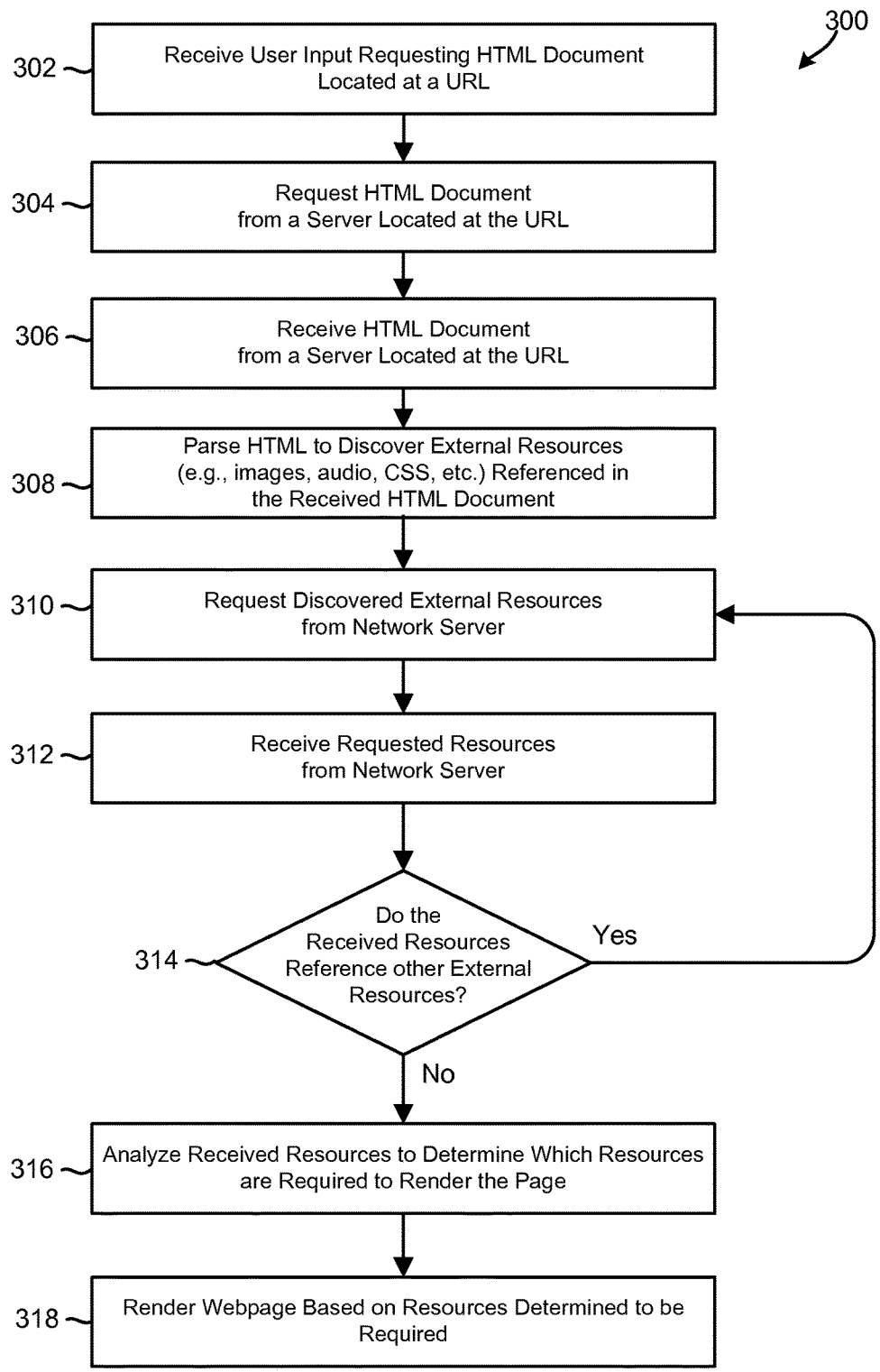
FIG. 3A is a process flow diagram illustrating an aspect browser method for rendering an HTML document.

FIG. 3A illustrates an aspect browser method 300 of loading and rendering an HTML document. In block 302, a web browser component may receive a user input requesting the loading of an HTML document located at a particular uniform resource locator (URL). In block 304, the web browser component may request the HTML document from a web server located at the URL via well known hypertext transfer protocol (HTTP) messages communicated via the Internet. In block 306, the web browser component may receive the HTML document from a web server located at the URL. In block 308, the web browser component may parse the received HTML document to identify/discover external resources (images, audio, CSS, etc.) referenced in the HTML file.

In block 310, the web browser component may request the identified external resources from network servers where the resources are maintained, which may include the server that provided the HTML document or any other server accessible via the Internet. In block 312, the web browser component may receive the requested external resources from the network server. In determination block 314, the web browser component may determine whether any of the received resources reference other external resources.

When the web browser component determines that the received resources reference other external resources (i.e., determination block 314="Yes"), the web browser may request/receive those other/additional external resources referenced by newly received resources in blocks 310-314. These operations may be repeatedly preformed until all referenced external resources have been downloaded.

When the web browser determines that the received resources do not reference any additional external resources (i.e., determination block 314="No"), in block 316, the web browser may analyze the received external resources to determine the resources that are required to properly render the webpage. In block 318, the web browser may render the webpage using the required download resources.

Figure 3B:
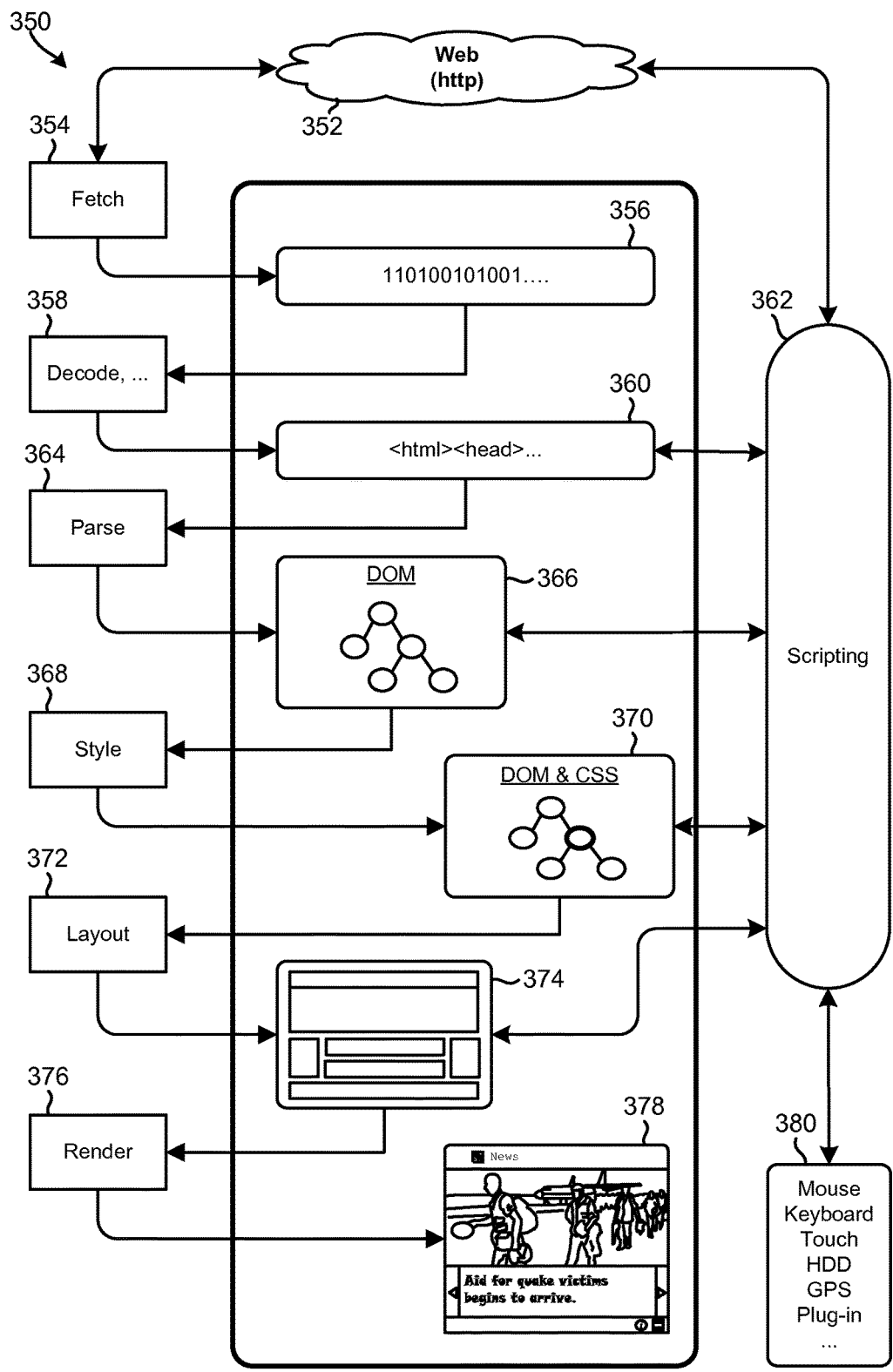
FIG. 3B is a function and process flow diagram illustrating example logical components, information flows, operations, and transformations in an aspect browser system.

FIG. 3B illustrates example logical components, information flows, operations, and transformations in an aspect browser system 350. The browser system 350 may be a software application/module configured to cause a processor to perform various operations for retrieving information and/or resources from the Internet and rendering webpages on an electronic display of a computing device (e.g., a mobile device).

The browser system 350 may include a scripting component 362 configured to interact with the web page at various stages and/or during various operations (e.g., during and after the page load operations, etc.) to provide interactivity with external modules 380. The external modules 380 may include user I/O modules (e.g., mouse, keyboard, etc.) and/or application modules (e.g., plug-ins, GPS, etc.). In an aspect, the scripting 362 component may include a JavaScript® engine configured to compile and/or execute JavaScript® code.

In block 354, the browser system 350 may perform a fetch operation to request/receive programming instructions 356 from a server in the Web 352 (e.g., via HTTP). In block 358, the browser system 350 may translate/decode the received programming instructions 356 to generate HTML code 360. The generated HTML 360 code may include (i.e., embed or include references to) JavaScript® code, the execution of which may generate additional HTML code for insertion into the containing HTML page (e.g., the HTML code in which the JavaScript® is included). Such generated HTML code may affect the behavior and/or presentation of the HTML page. The generated HTML 360 code may also include style sheets and/or CSS code.

In block 364, the browser system 350 may parse the HTML 360 code (and embedded/referenced JavaScript® code) to generate a document object model (DOM) 366 of the HTML document. The DOM 366 may represent the contents, relationships, styles, and positions of various objects in the HTML code. Communications between browser "passes" and components may occur via the DOM 366. A "browser pass" may be a thread, process, or application associated with a single iteration through relevant portions of the HTML document. In an embodiment, a browser pass may be a "work item."

As mentioned above, JavaScript® code may be embedded in HTML code, and at the same time, generate additional HTML code to be inserted into the containing HTML page. To enable the insertion of code (and to ensure proper order) two different processes may be required to interpret, parse, and execute the JavaScript® code and the containing HTML code. Thus, in an aspect, the parse operations of block 364 may be performed by multiple processes or applications.

In block 368, the browser system 350 may perform style operations to generate a modified DOM tree 370 by, for example, applying one or more style sheets (e.g., CSS) to the HTML document and/or to the generated DOM 366 tree.

In block 372, the browser system 350 may "solve" the page layout 374 by performing layout operations. In an aspect, the layout operations may be performed so that the page layout is solved incrementally as additional content necessary to display the page becomes available (e.g., is downloaded, processed, and/or added to the DOM).

In block 376, the browser system 350 may perform render operations to display content 378 of the HTML document on an electronic display of a computing device.

The various aspects modify the underlying serial nature of existing browser processing algorithms. Various aspects may include a dynamic and concurrent browser system that supports a high degree of parallelism and/or concurrency. Various aspects may exploit concurrency at multiple levels. Various aspects may perform parallel algorithms for individual browser passes to speed up processing and/or executions times of various browser components and/or operations. Various aspects may overlap browser passes to speed up total execution time.

Figure 4:
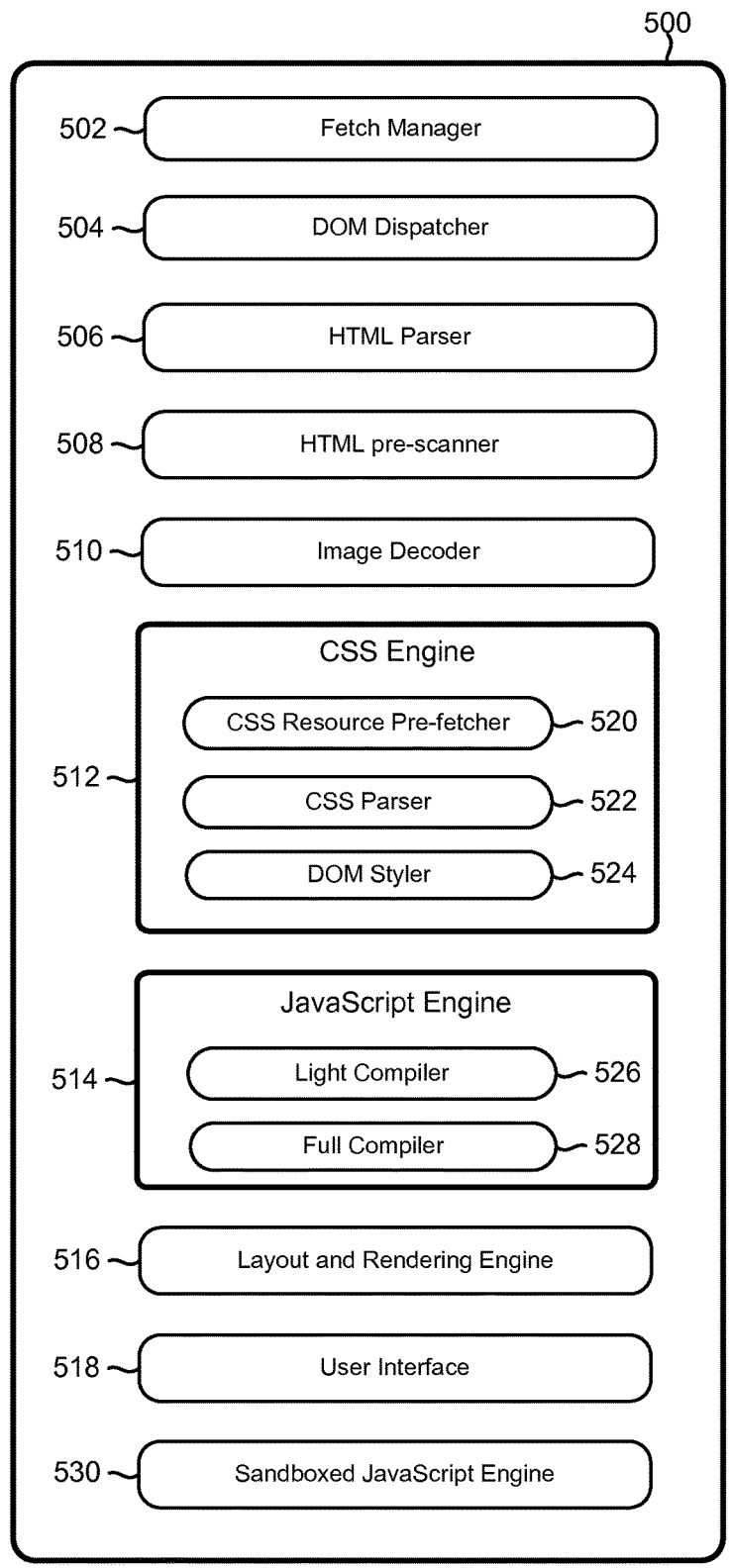
FIG. 4 is a function block diagram illustrating example logical components, functional components, information flows, and subsystems in an aspect browser system.
Figure 5:
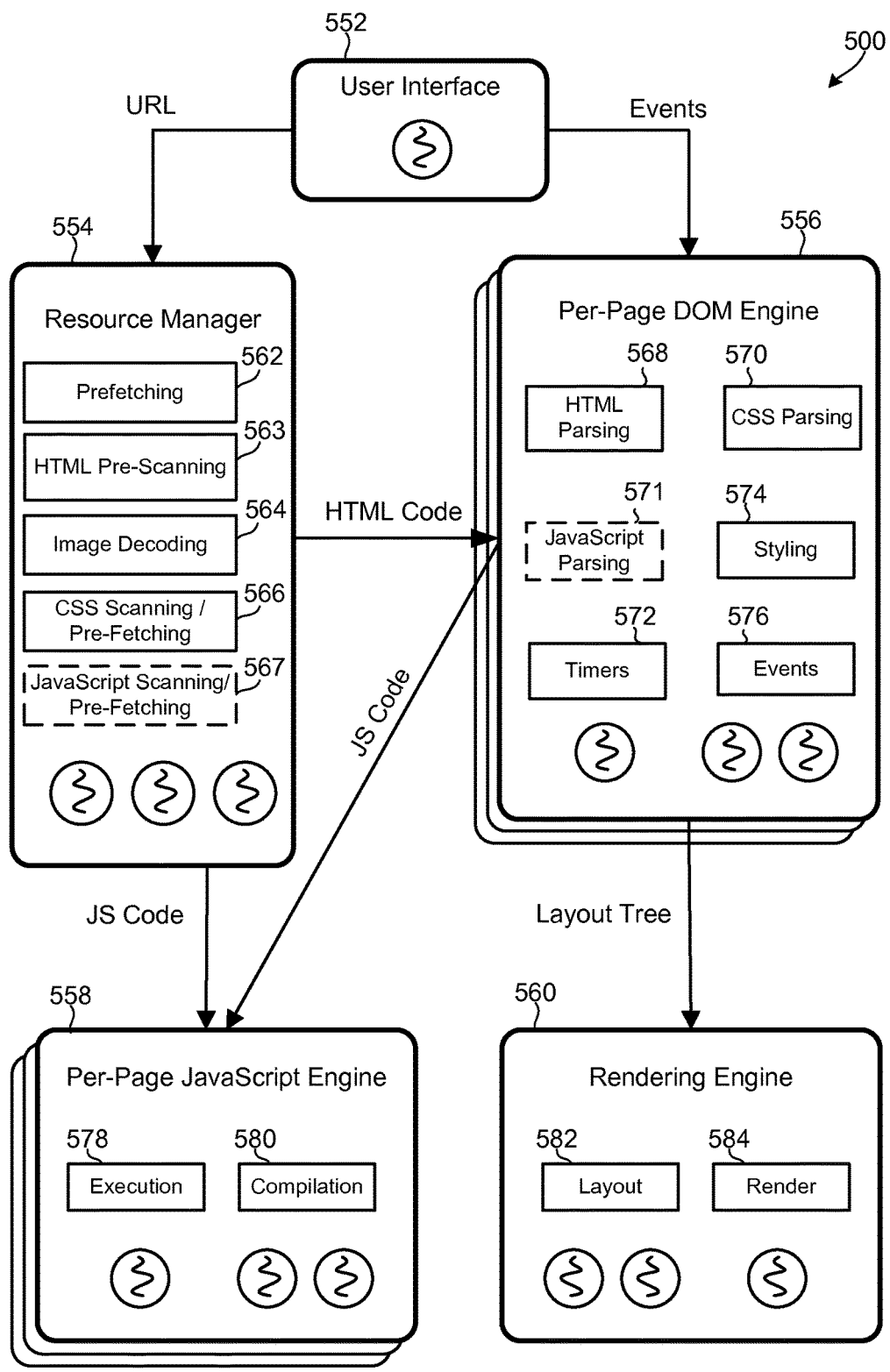
FIG. 5 is a function block diagram illustrating aspect browser system implementing a parallel browser infrastructure in accordance with an aspect.

FIGS. 4 and 5 illustrate example components, information flows, and subsystems in an aspect browser system 500 suitable for exploiting concurrency at multiple levels in accordance with various aspects.

FIG. 4 illustrates a browser system 500 that includes a fetch manager component 502, a DOM dispatcher component 504, an HTML parser component 506, an HTML pre-scanner component 508, an image decode component 510, a CSS engine component 512, a JavaScript® engine component 514, a layout and rendering engine component 516, and a user interface component 518. In an aspect, the browser system 500 may also include a sandboxed JavaScript® engine component 530. Each of these components 502-530 may be a software module (e.g., a process running on a processor, a thread of execution, a thread pool, a program, etc.). In various aspects, any or all of the components 502-530 may utilize a thread library (e.g., Pthreads, etc.) or a parallel task library (e.g., Intel Thread Building Blocks, Cilk, etc.) to support concurrency. In an aspect, the browser system 500 components 502-518, 530 may be loosely coupled and configured to support concurrency.

The fetch manager component 502 may be configured to fetch resources from the network, perform cache management for fetched resources, and provide notifications for the arrival of data from the network to other browser components. In an aspect, the fetch manager component 502 may be configured to fetch resources in the order in which they appear in the HTML document (i.e., without imposing any priorities). In another aspect, the fetch manager component 502 may be configured to assign priorities and/or fetch resources based on pre-assigned priorities.

The DOM dispatcher component 504 may be configured to schedule DOM updates, serialize access to the DOM tree, and manage the interaction between the various browser components. The other subsystems (i.e., the rest of the browser infrastructure) may dispatch work items (also called "DOM dispatcher work items") into a concurrent DOM dispatcher queue. The DOM dispatcher component 504 may be configured to pull the work items from the DOM dispatcher queue, and process the work items one at a time. In various aspects, the work items may include browser passes and/or events (e.g., timer events, events from the user interface, etc.).

The HTML parser component 506 may be configured to receive incoming (e.g., partial, etc.) data chunks of an HTML document (e.g., via DOM dispatcher work items, etc.), and construct a DOM tree by executing an HTML parsing algorithm (e.g., an HTML5 parsing algorithm, etc.). The HTML parser component 506 may add external resources referenced in the HTML document to a fetch manager queue accessible to the fetch manager component 502. The HTML parser component 506 may also initiate execution of JavaScript® code by calling the JavaScript® engine component 514 at appropriate times during the parsing operations.

The HTML pre-scanner component 508 may be configured to scan the HTML document to quickly determine the external resources that are requested/required by the HTML document. The HTML pre-scanner component 508 may task (e.g., via a notification, memory write operation, etc.) the fetch manager component 502 to begin downloading the external resources and/or performing further processing based on the external resources.

The image decoder component 510 may be configured to decode images. For example, when the fetch manager component 502 has received the complete data for an image, it may hand off the image to the image decoder component 510, which may then decode the image for later use.

The CSS engine component 512 may be configured to calculate the look and feel of the DOM elements for use in later stages (e.g., the layout and rendering stages). Similar to the image decoding operations discussed above, the fetch manager component 502 may hand off CSS style sheets to the CSS engine for parsing and for discovering new resources to be requested.

In an aspect, the CSS engine component 512 may include a CSS resource pre-fetcher component 520, CSS parser component 522, and a DOM styler component 524. The CSS resource pre-fetcher component 520 may perform CSS scanning and/or pre-fetching operations, which may include scanning a CSS document to quickly determine what external resources are requested/required by the CSS document. In an aspect, the CSS resource pre-fetcher component 520 may task the fetch manager component 502 to begin downloading the external resources and/or performing further processing based on the external resources.

The CSS parser component 522 may be configured to read CSS code and create a collection of data structures (e.g., CSS rules) in memory. The DOM styler component 524 may be configured to use the data structures created by the CSS parser component 522 to determine the style of the nodes in the DOM tree. For each node, the CSS engine component 512 may perform rule matching operations to find the rules whose selectors match the node. Such rule matching operations may return many (and sometimes conflicting) rules per node. In various aspects, the CSS engine 512 may be configured to use cascading operations to assign weights to rules and choose the rules with the greatest weight.

The JavaScript® engine component 514 may be configured to compile and execute JavaScript® code. The fetch manager 502 may download JavaScript® scripts and send them to the JavaScript® engine component 514 to be compiled. The HTML parser 506 and/or the DOM dispatcher 504 may request that the JavaScript® engine component 514 execute scripts.

The JavaScript® engine component 514 may include a thread pool for compilation tasks/operations, and may be configured to compile multiple scripts (JavaScript® code) in parallel. Due to JavaScript® semantics, in an aspect, the execution of scripts may be performed sequentially in the main engine thread. In an aspect, the JavaScript® engine component 514 may be configured so that, when the HTML parser 506 or the DOM dispatcher 504 (e.g., for user interface events) requests the JavaScript® engine component 514 to execute a script that has not been compiled, the JavaScript® engine component 514 automatically initiates compilation of the scripts and waits for the results of the compilation before attempting to execute the requested script.

In various aspects, the JavaScript® engine component 514 may include a light compiler 526 and a full compiler 528 (e.g., to support adaptive compilation and execution of the JavaScript® code). The light compiler 526 may be configured to generate executable code for infrequently reused JavaScript® code and/or optimized for page load. The full compiler 528 may be configured to generate higher quality code for heavily reused JavaScript® code and/or optimized for interactivity and web applications. In various aspects, the slower code generation of the full compiler 528 may be amortized between multiple runs of the reused code. Compared to the light compiler 526, the full compiler 528 may achieve significant speedup for iterative web applications. For example, using the full compiler 528, an N-body simulation web application may run faster by a factor of six.

The sandboxed JavaScript® engine component 530 may be an isolated JavaScript® engine that is separate from the primary JavaScript® engine component 514. The sandboxed JavaScript® engine component 530 may include all the components, features, and functionality JavaScript® engine component 514.

The layout and rendering engine component 516 may be configured to transform the styled DOM tree into a viewable web page. In an aspect, the layout and rendering engine component 516 may be configured to reflect changes to the DOM and/or CSS style sheets on the electronic display of the mobile device so that the user can view and interact with an updated HTML document. The changes to the DOM and/or CSS may be due to the fetch manager component 502 delivering new resources, the HTML parser component 506 updating the DOM, as a result of a JavaScript® engine component 514 computation, etc.

In an aspect, the layout and rendering engine 516 may be configured to take a snapshot of the DOM information and perform the layout and/or render operations asynchronously. In another aspect, the layout and rendering engine 516 may be configured to invoke layout and/or render operations synchronously (e.g., when JavaScript® makes use of APIs that query layout information).

The user interface component 518 may be configured to manage interactions between the browser system 500 and a mobile device user. The user interface component 518 component may translate user interactions (e.g., touching a link on the electronic display of a mobile device) into function/method calls (e.g., Java Native Interface or "JNI" method calls) that create work items for placement in the DOM dispatcher queue.

In an aspect, all the above-mentioned components 502-518, 530 may instantiated once for each webpage. In another aspect, the fetch manager component 502 and the layout and rendering engine component 516 may be global, whereas the other components (e.g., 504, 506, 508, 510, 512, 514, and 518) may instantiated once for each webpage or HTML document.

Figure 6:
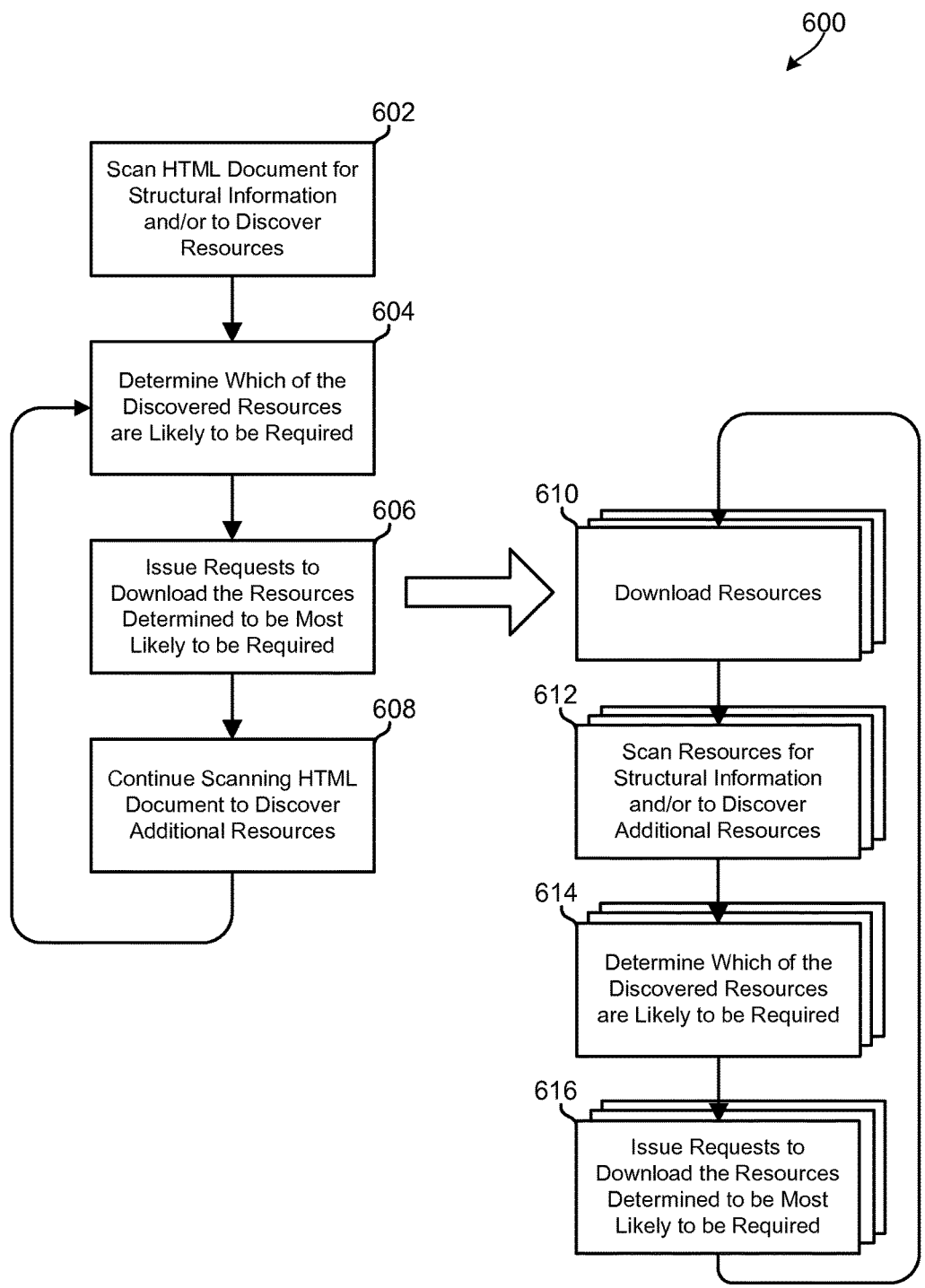
FIG. 6 is a process flow diagram illustrating an aspect browser method of processing an HTML document to discover and pre-fetch resources in advance of the page loading/rendering operations.

FIG. 6 illustrates example subsystems and information flows in the aspect browser system 500 discussed above. Specifically, FIG. 6 illustrates that the browser system 500 may include a user interface subsystem 552, a resource manager subsystem 554, a per-page DOM engine subsystem 556, a per-page JavaScript® engine subsystem 558, and a rendering engine subsystem 560.

Each of the subsystems 555-560 may be loosely coupled and configured to support concurrency. The subsystems 552-560 may be implemented as software modules (e.g., a process running on a processor, a thread of execution, a program, etc.). The operations of the subsystems 552-560 may be performed by one or more of the components discussed above with reference to FIG. 4 and/or on any single or multiprocessor computing system.

In an aspect, the resource manager subsystem 554 and rendering engine subsystem 560 may be instantiated once (e.g., may be global), and the per-page DOM engine subsystem 556 and the per-page JavaScript® engine subsystem 558 may be instantiated once for each webpage or HTML document.

The user interface subsystem 552 may be configured to perform various operations for managing user interactions with the browser system 550, including translating user interactions (e.g., touching a link on the electronic display of a mobile device) into function/method calls that create work items for placement in a DOM dispatcher queue, detecting and/or sending events to the correct instance of the per-page JavaScript® engine subsystem 558, and/or sending uniform resource locator (URL)/uniform resource identifier (URI) information to the resource manager subsystem 554 (e.g., via a memory write operation, function call, etc.).

The resource manager subsystem 554 may be configured to perform pre-fetching operations 562, HTML pre-scanning operations 563, image decoding operations 564, CSS scanning/pre-fetching operations 566, and JavaScript scanning/pre-fetching operations 567. By way of example, these operations may be performed by the fetch manager 502, the HTML pre-scanner 508, the image decoder 510, the CSS engine 512, and/or the JavaScript engine 514, 530 components, or by any combination of the components discussed above with reference to FIG. 4.

The pre-fetching operations 562 may include requesting/receiving resources and/or programming instructions from a web server corresponding to the URL/URI, translating or decoding the received programming instructions to generate HTML, and sending the generated HTML code to the correct instance of the per-page JavaScript® engine subsystem 558 (e.g., via a memory write operation, etc.).

The generated HTML code may embed and/or reference JavaScript® code, CSS code, images, and various other resources. Resources most commonly referenced in an HTML document are images, CSS style sheets, and JavaScript® sources. Style sheets and JavaScript® sources may also reference further external resources. In an aspect, the generated HTML code may be scanned so that all references identified by the HTML document (including the embedded or referenced style sheets and JavaScript® sources) may be fetched in advance (e.g., as part of the pre-fetching operations 562).

The HTML pre-scanner operations 563 may include scanning the generated HTML code to quickly discover requested/required external resources, and informing a fetch manager and/or pre-fetcher that it may begin downloading the external resources and/or performing further processing based on the discovered external resources. In an aspect, the downloading of external resources may be performed as part of the pre-fetching 562 operations discussed above. In an aspect, the HTML pre-scanner operations 508 and the pre-fetching operations 562 may be performed concurrently (e.g., in separate threads/processes).

The image decoding operations 564 operations may include decoding images for later use by the rendering engine subsystem 560. The image decoding operations 564 may be performed in response to determining that the complete data set for an image has been downloaded (e.g., via a memory write operation performed as part of the pre-fetching 562 operations, etc.) and/or in response to receiving a notification (e.g., from a fetch manager 520 component). In an aspect, the image decoding operations 564 may be performed concurrently with the HTML pre-scanner operations 563 and the pre-fetching operations 562.

The CSS scanning/pre-fetching operations 566 may include scanning CSS style sheets embedded in (or referenced by) the generated HTML code to quickly discover requested/required external resources requested by the CSS style sheets. In an aspect, the CSS scanning/pre-fetching operations 566 may include informing a fetch manager and/or pre-fetcher that it may begin downloading the discovered external resources. In an aspect, the CSS scanning/pre-fetching operations 566 may include initiating the downloading of the discovered external resources. In an aspect, the CSS scanning/pre-fetching operations 566 may be performed in the CSS engine component 512 (e.g., by the CSS resource pre-fetcher 520) in response to the fetch manager component 502 sending one or more CSS style sheets to the CSS engine component 512. In an aspect, the CSS scanning/pre-fetching operations 566 may be performed concurrently with the image decoding operations 564, the HTML pre-scanner operations 563, and the pre-fetching operations 562.

The per-page DOM engine subsystem 556 may be configured to perform HTML parsing operations 568, CSS parsing operations 570, timer operations 572, styling operations 574, and operations to manage events 576. In an aspect, the operations of the per-page DOM engine subsystem 556 may be performed concurrently with the operations of the other subsystems 552, 554, 558, 560.

The HTML parsing operations 568 may include parsing the received HTML code, separating the HTML markup tags from the substantive content, and/or generating a DOM of the received HTML code. The HTML parsing operations 568 may also include identifying external resources referenced in the HTML document so that the identified external resources may be downloaded by the fetch manager 502 and/or as part of the pre-fetching operations 562. The HTML parsing operations 568 may further include initiating execution of JavaScript® code (e.g., by invoking the execution operation 578) during the parsing of the HTML code (e.g., as JavaScript® is discovered, etc.).

The CSS parsing operations 570 and the styling operations 574 may include applying one or more CSS style sheets to the generated DOM tree (or generating a modified DOM tree based on CSS style sheets). In various aspects, any or all of the HTML parsing operations 568, CSS parsing operations 570, and styling operations 574 may be performed concurrently.

The timer operations 572 may include managing or responding to events and/or conditions relating to timers and/or timer classes (e.g., System.Timers).

The events operations 576 may include managing various events, such as timer events and user interface events (e.g., an event generated in response to a user touching a link on the electronic display of a mobile device).

The per-page JavaScript® engine subsystem 558 may be configured to perform JavaScript® execution operations 578 and JavaScript® compilation operations 580.

In various aspects, the per-page DOM engine subsystem 556 and/or the resource manager subsystem 554 may be configured to send JavaScript® code embedded in (or referenced by) the HTML code to the correct instance of the per-page JavaScript® engine 558 for compilation and/or execution (i.e., via the execution 578 and compilation 580 operations). In aspect, the JavaScript® engine 558 may update/modify the generated DOM tree based on the results of the JavaScript® compilation and/or execution operations 578, 580.

The rendering engine subsystem 560 may be configured to perform layout operations 582 and render operations 584. For example, the rendering engine subsystem 560 may receive (e.g., via memory writes, calls, notifications, etc.) a DOM tree and/or layout tree from the per page DOM engine subsystem 556, solve the page layout (via the layout operation 582), and display the content on an electronic display of a computing device (via the render operation 584). In an aspect, performing layout operations 582 may include solving the page layout incrementally as additional content becomes available (e.g., is downloaded, processed, and/or added to the DOM tree) to the rendering engine subsystem 560. In various aspects, any or all of the layout operations 582 and/or render operations 584 may be performed concurrently.

As discussed above with reference to FIGS. 5A and 5B, the HTML parser 506 and/or the CSS parser 522 may discover external resources (images, audio, CSS, JavaScript®, etc.) requested/required for rendering the HTML document and request that the discovered resources be downloaded, such as via the fetch manager 502 and/or as part of the pre-fetch operations.

Mobile devices may experience high latency times when downloading resources discovered in HTML and CSS code/content. For example, due to idiosyncrasies in the HTML5 specification, an HTML parser must wait for a script element (e.g., <script> blocks) to finish executing before it can continue parsing the remaining portions of the HTML document. Thus, if a web page references an external resource after a script element, the operation of fetching that resource cannot be overlapped with the operation of waiting for script element to finish execution. This often increases the time required to download and display a webpage.

In various aspects, the browser system 500 may be configured to speculatively parse ahead of the script elements to discover new resources without waiting for the script element to finish execution. In these aspects, the browser system 500 may be forced to discard some of the results of the speculative parsing (e.g., when JavaScript® inserts new content into the DOM tree via the document-.write API, etc.).

In an aspect, the browser system 500 may be configured to perform aggressive resource pre-fetching operations to discover the requested/required resources as early as possible and request multiple resources to be fetched/downloaded in parallel. In this manner, the various aspects may prevent the browser system 500 from being forced to discard some of the results of speculative parsing, and may mask network latencies, utilize more of the available bandwidth, and reduce the overall time spent waiting for resources to arrive.

The browser system 500 may be configured to perform aggressive resource pre-fetching operations, which may include speculative resource prefetching via sandboxed execution. In various aspects, these aggressive resource pre-fetching operations may performed as part of the HTML pre-scanning operations 563, CSS pre-fetching operations 566, or both.

Referring to FIGS. 4-5, the HTML pre-scanning operations 563 performed in furtherance of the aggressive resource pre-fetching operations may include obtaining all "id", "class", and/or "style" attributes in the HTML document, quickly discovering external resources referenced in the HTML document, and triggering the downloading of the discovered resources from the network. The HTML pre-scanner 508 may "approximately parse" the HTML in order to discover resources, without performing any of the substantive or computationally intensive processing (e.g., construction the DOM tree) that is required from the HTML parser 506. By forgoing these complex parsing operations, the HTML pre-scanning operations 563 may be performed concurrent with (and run ahead of) the HTML parsing operations 568, and do not have to wait for the script elements to finish execution.

In an aspect, network packets may be sent to the HTML pre-scanner 508 and the HTML parser 506 independently, as they arrive. In an aspect, the time spent waiting for resources to arrive may be further reduced by performing HTML pre-scanning operations 563 in parallel to the (non-speculative) HTML parsing 570 operations.

As discussed above, the web browser system 500 may include a CSS parser 522 configured to quickly scan a CSS document and a CSS resource pre-fetcher 520 configured to perform CSS pre-fetching operations. In an aspect, CSS style sheets may be dispatched to a thread pool responsible for parsing CSS concurrently. If a CSS rule contains further external resources, the CSS resource parser 520 may make a decision regarding whether to initiate prefetching for the further external resources based on the likelihood that they are actually referenced in the HTML document. In an aspect, the CSS resource pre-fetcher 520 may be configured to download (or initiate the downloading of) a specific range/number of referenced resources (downloading too few resources may mean that more new resources will be discovered by the DOM styler 524 when styling the DOM tree later on, which may result in additional latencies).

It is common practice among websites to reference many more resources than are actually needed for any given document by, for example, using a site-wide common style file. Downloading all included resources may consume excess bandwidth and slow down page loading. In various aspects, the CSS parser 522 may be configured to employ the "id" and "class" attributes discovered by the HTML pre-scanner 508 to determine whether a CSS rule is likely to be matched. If all of the attribute values referenced in a CSS rule selector have been seen/evaluated by the HTML pre-scanner 508, it may be determined that the rule is likely to match at least one DOM tree element, and the browser system 500 may initiate the downloading of the resources corresponding to the CSS rule. This "CSS rule" heuristic is very effective, and wrong decisions do not have a significant negative impact on the operations of the browser system 500. Missed resources may be discovered during the DOM styling phase (via the DOM styler component 524) at the cost of the latency required to download the resource.

In an aspect, the HTML pre-scanner 508 may be configured to identify and/or discover resources that may be discovered without having to execute JavaScript®.

As discussed above, mobile devices may experience high latency times when downloading resources discovered in HTML and CSS code/content due to idiosyncrasies in the HTML5 specification, such as the HTML parser being required to wait for a script element (e.g., <script> blocks) to finish executing before it can continue parsing. In addition, modern web documents (e.g., HTML pages, HTML documents, etc.) may reference a large number of external resources, and each external resource may include references to other external resources. For example, HTML documents typically include references to various external resources, such as images, audio, Cascading Style Sheets (CSS), and JavaScript®, and the referenced resources (e.g., CSS, JavaScript®) may further include references to additional external resources (e.g., images, audio, etc.).

The document load time (i.e., time from requesting a document until it is ready to be displayed on screen) is dominated by input/output costs (e.g., network transfers of needed resources). The minimal document load time needed to load all required resources is constrained by the bandwidth of the connection between resource storage and computing device. Also, transferring document resources to the displaying device incurs a latency cost. Various aspects may be configured to start resource transfers as early as possible to better utilize the available bandwidth, overlap transfer latencies, and improve document load times.

As mentioned above, since not all of the referenced external resources are required (or even used) to render a given webpage, recursively downloading all of the referenced resources may waste a significant amount of bandwidth and power. In addition, when any of the resources are not immediately available, the browser must wait until it receives and analyzes those resources before the page can be properly rendered. This increases the amount of time that is required to load and/or render the webpage (e.g., document load time), and degrades the user experience.

Conventional solutions attempt to speed up rendering of web pages using techniques such as caching portions of web pages in memory to reduce the information that must be downloaded the next time the page is accessed. However, using conventional solutions, a web browser cannot identify the external resources that are required to render a web page for the first time without first analyzing the entire document (i.e., webpage), requesting and receiving most (if not all) of the resources referenced in the document and subdocuments, and analyzing the received resources. Thus, using conventional solutions, the precise set of resources required by the document cannot be determined until after the entire document has been fully analyzed.

To overcome these limitations of existing solutions, various aspects may utilize speculation/prediction techniques to identify resources required to render a web page or document before the entire document has been analyzed.

Generally, speculatively predicting whether a resource is required (based on an incomplete set of information) results in one of four possible outcomes: a true positive; a true negative; a false positive; and a false negative. A true positive outcome is when a resource was speculatively downloaded and was later actually required. A true negative outcome is when the resource was not speculatively downloaded and was not required. A false positive outcome is when a resource that isn't required is speculatively downloaded (which wastes bandwidth and energy) and a false negative outcome is when the resource is not speculatively downloaded but is required (thus there is nothing gained with respect to this resource from the speculative preprocessing).

The true positive and true negative outcomes are beneficial and desired because such decisions improve the user experience by reducing page load times. However, false positive and false negative outcomes are disadvantageous. For example, a false negative may result in a resource being requested during the rendering of a document (e.g., HTML document), which may extending document load times until the resources is available. Since the resource is not required for the browser to properly render the document, it is a waste of computing and network resources (bandwidth, processing, etc.).

Various aspects include web browser systems configured to perform speculative resource downloading operations based on heuristics to maximize the number of true positives and true negative while minimizing the number of false positive and false negative download decisions.

FIG. 6 illustrates an aspect browser method 600 of processing an HTML document to discover the external resources (images, audio, CSS, JavaScript®, etc.) required for proper rendering of the webpage and pre-fetching the discovered resources in advance of the page loading/rendering operations. The operations of method 600 may be performed by a processor of a single or multiprocessor computing system executing a suitably configured web browser.

Referring to FIG. 6, in block 602, a web browser may initiate or invoke a scan operation (e.g., via the HTML pre-scanner 508, CSS engine 512, etc.) to scan the HTML document and/or CSS documents for the structural information and/or to discover resources. In an aspect, the scan operation may be performed as part of the HTML pre-scanning operations 563. In an aspect, the scan operation may be performed as part of the CSS scanning operations 566. In various aspects, the scan operation may be executed concurrent with, and independent of, the HTML and CSS parsing operations 568, 570. In various aspects, the scan operation may be performed by a process, thread, application, a work item, and/or browser pass.

In block 604, the scan operation (e.g., HTML and/or CSS scanning operation 563, 566) may determine (i.e., predict, speculate) which of the discovered resources are likely to be required. In block 606, the scan operation may issue resource requests (e.g., via a memory write operation, etc.) to a browser fetch component (e.g., to the fetch manager 502) to begin downloading resources determined to have a high probability of being required. In an aspect, as part of block 606, two or more resource requests may be issued (or sent) in parallel or concurrently. In an aspect, each resources request may spawn a new process and/or be processed by a different thread of execution. In block 608, the scan operation may continue scanning the HTML document and/or CSS documents to discover additional required resources. The operations in blocks 604-608 may be repeated until all external resources are discovered and/or the entire HTML document is scanned.

In block 610, the web browser may initiate or invoke a fetch operation (e.g., via the fetch manager 502) to download one or more resources identified by the resource request (e.g., resource request issued by the scan operation in block 606).

In block 612, the web browser may scan the downloaded resources to discover additional references to external resources. As part of block 612, the web browser may initiate or invoke a new process or thread of execution to perform the scanning operations. In an aspect, as part of block 612, the web browser may initiate or invoke a CSS scanning operation 566. In an aspect, as part of block 612, the web browser may initiate or invoke an HTML scanning operation 563.

In block 614, the web browser may determine (i.e., predict, speculate) the discovered resources that are likely to be required based on scanning the downloaded resources. In block 616, the web browser may issue additional resources requests (e.g., via a memory write operations, etc.) to a browser fetch component (e.g., to the fetch manager 502) to being downloading resources determined to have a high probability of being required. In an aspect, each of these additional resource requests may spawn other processes and/or may be processed by a different process or thread of execution. The operations in blocks 610-616 may be repeated until all external resources are discovered and/or downloaded. In an aspect, the operations of blocks 602-608 may be performed in parallel with the operations in blocks 610-616.

Unlike conventional HTML parsers, the scan operations discussed above with reference to FIG. 6 do not perform error correction on the scanned HTML document or execute encountered JavaScript® code. This enables the scan operations to be performed quickly. Also, unlike conventional HTML parsers, the scan operations discussed above may be executed in parallel or concurrently (e.g., in independent threads or processes, etc.), which enables the various aspects to more fully utilize multiprocessor architectures prevalent in modern computing devices. Additionally, the scan processes discussed above may scan resources referenced in the HTML document (e.g., CSS documents), which is also not performed in conventional HTML parsers.

Generally, if a scan operation (e.g., HTML pre-scanning operations 563, CSS scanning operations 566, etc.) only scans the structure of the HTML document, it is likely to correctly speculate regarding the resources that are required (i.e., produce only true positives) unless, for example, there are structural errors in the document (since the scanner does not perform error correction) or embedded JavaScript® code in the document that makes alterations to the document as it is parsed (since the scanner does not execute JavaScript®).

In an aspect, to maximize the number of true positives and true negatives, the scan operations (e.g., HTML pre-scanning operations 563, CSS scanning operations 566, etc.) may identify the resources that are likely to be required using information obtained during the initial scan of the HTML document.

Figure 7A:
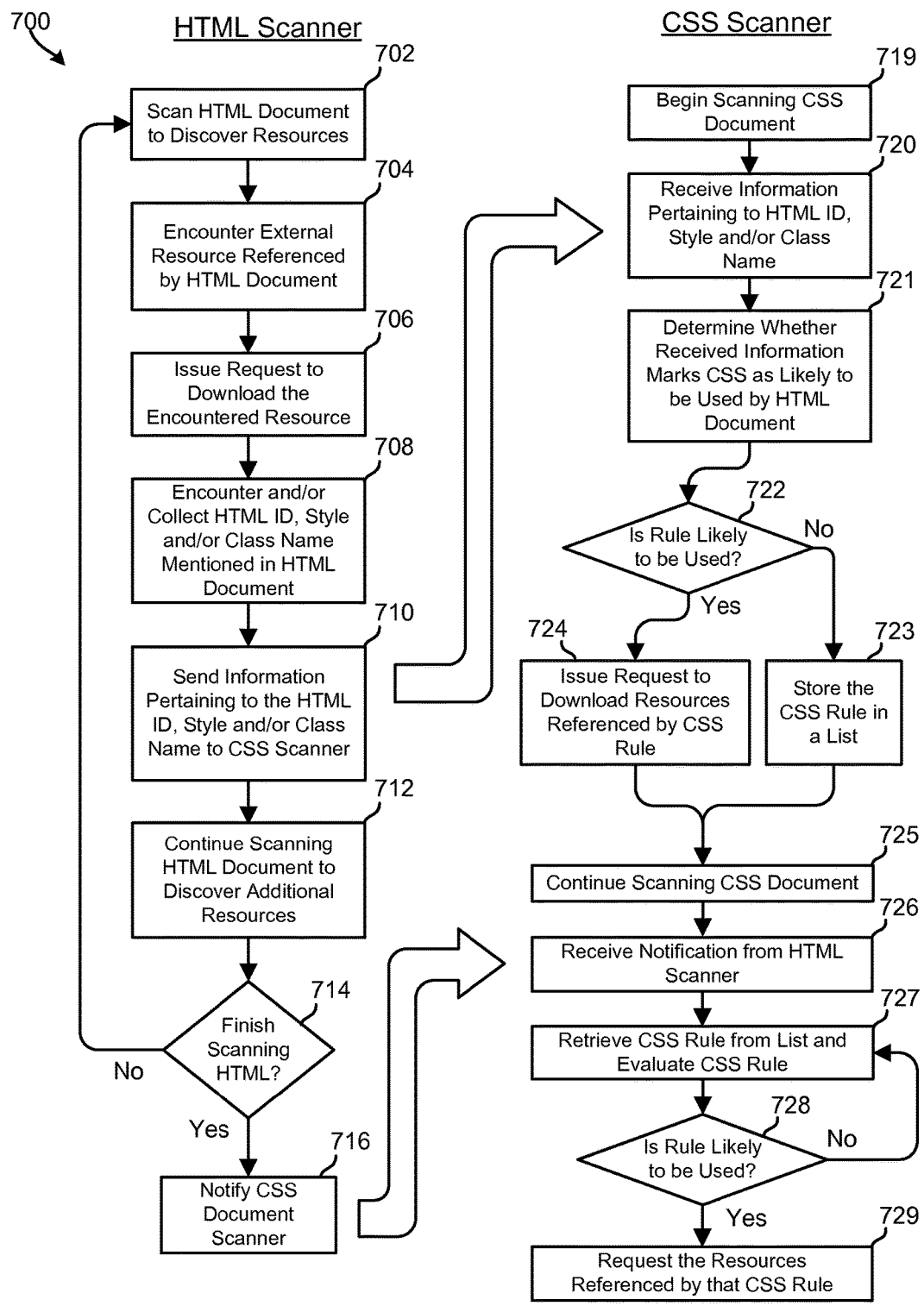
FIG. 7A is a process flow diagram illustrating an aspect browser method of using speculation techniques and heuristics to predict the usage of document resources.

FIG. 7A illustrates an aspect browser method 700 of using speculation techniques and heuristics to discover document resources for speculative downloading. The document resources may include images, CSS files, JavaScript® scripts, etc. The browser method 700 enables a HTML document scanner and a plurality of CSS documents scanners to execute in parallel, intelligently identifies the resources that are likely to be required, reduces the number of false negatives that result from the speculative resource requests and/or pre-fetching operations. In an aspect, the browser method 700 may utilize a heuristic (e.g., a "CSS rule" heuristic) to minimize the number of false positives.

In block 702 of browser method 700, an HTML document scanner (e.g., HTML pre-scanner 508) may begin scanning a HTML document to discover resources and obtain all URL/URIs, and HTML "id", "class", and/or "style" attributes associated with (or mentioned by) HTML elements included the HTML document. The HTML document scanner may be independent of, and/or execute in parallel with, an HTML parser.

In block 704, the HTML document scanner may encounter an external resource referenced by URL/URI's and/or HTML elements included in the HTML document. In block 706, the HTML document scanner may issue a request (e.g., to a fetch manager) to download encountered resources referenced in the HTML document. In an aspect, the HTML document scanner may be configured to invoke the downloading and/or parsing of each encountered external CSS resource (e.g., as the external resources are encountered by the scanner, etc.). In an aspect, the downloading of an external CSS resource may cause a CSS document scanner (e.g., CSS engine 512, etc.) to begin scanning the CSS document.

In block 708, the HTML document scanner may encounter and/or collect HTML id, class, and style attributes. In block 710, the HTML document scanner may send the encountered/collected information (i.e., information pertaining to the collected id, class, and style attributes) to a CSS document scanner. In an aspect, sending the collected information may include sending every encountered and/or identified HTML id, class, and style attribute to the CSS document scanner.

In block 712, the HTML document scanner may continue scanning the HTML document to discover additional resources. In determination block 714, the HTML document scanner may determine whether it has finished scanning the HTML document. When the HTML document scanner determines that it has finished scanning the HTML document (i.e., determination block 714="Yes"), in block 716, the HTML document scanner may notify a CSS document scanner (e.g., CSS engine 512, a process performing the CSS scanning operations 566, etc.) that it has finished scanning the HTML document (e.g., via a memory write operation, method call, notification, etc.). When the HTML document scanner determines that it has not yet finished scanning the HTML document (i.e., determination block 714="No"), in block 702, the HTML document scanner may continue scanning the HTML document to discover additional resources.

In block 719 of browser method 700, the CSS document scanner may begin scanning a CSS document for external resources. Initiation of a CSS document scanner in block 719 may be triggered by availability of a CSS document obtained by a fetch manager (e.g., in response to operations performed as part of block 706, etc.). In an aspect, the scanning of CSS documents may be performed in parallel with the scanning of the HTML document (e.g., operations in blocks 702-716). Thus, the CSS document scanner may scan received CSS documents to identify external resources referenced in those documents while the HTML document scanner continues to scan the HTML document (e.g., identifying additional CSS documents for download, etc.). Further, there may be multiple CSS document scanners executing in parallel (e.g., when multiple CSS documents are downloaded).

In block 720, the CSS document scanner may receive information pertaining to HTML id, class, and/or style attributes from the HTML document scanner. In block 721, the CSS document scanner may determine whether the received information marks or identifies a CSS rule and/or external resource (associated with the received HTML id, class, and/or style attributes) as likely to be required and/or used by the HTML document. In aspect, as part of block 721, the CSS document scanner may determine whether every HTML id, class, and/or style attribute associated with a CSS rule has already been encountered by the HTML document scanner.

In determination block 722, the CSS document scanner may determine whether the CSS rule and/or external resource (associated with the received HTML id, class, and/or style attributes) is likely to be required and/or used by the HTML document. In an aspect, as part of determination block 722, the CSS document scanner may determine whether every URL/URI, and HTML id, class, and/or style attribute mentioned by the HTML document has already been encountered.

When the CSS document scanner determines that the CSS rule and/or external resource is likely to be required and/or used by the HTML document (i.e., determination block 722="Yes"), in block 724, the CSS document scanner may immediately request the resources referenced by that CSS rule to be downloaded, such as by performing a memory write operation and/or notifying the fetch manager 502.

In an aspect, the CSS document scanner may determine that the CSS rule and/or external resource is likely to be required when it is determined that every URL/URI, and HTML id, class, and/or style attribute, mentioned by the HTML document has already been encountered.

When the CSS document scanner determines that the CSS rule and/or external resource is not likely to be required and/or used by the HTML document (i.e., determination block 722="No"), in block 723, the CSS document scanner may store in memory information pertaining to the CSS rule (e.g., the received HTML id, class, and/or style attributes) in a list of resource references. In block 725, the CSS document scanner may continue scanning the CSS document, if necessary (e.g., when there are additional elements to be scanned/processed, etc.).

In block 726, the CSS document scanner may receive a notification from the HTML document scanner indicating that the HTML document scanner has finished scanning the HTML document. In block 727, the CSS document scanner may retrieve information pertaining to a CSS rule from the list of resource references stored in the memory and evaluate the retrieved information.

In determination block 728, the CSS document scanner may determine whether the retrieved information marks/identifies a CSS rule and/or external resource being required (or likely to be required) by the HTML document. In aspect, as part of determination block 728, the CSS document scanner may determine whether every HTML id, class, and/or style attribute associated with the retrieved CSS rule has already been encountered and/or processed by the HTML document scanner.

When the CSS document scanner determines that retrieved information marks/identifies a CSS rule and/or external resource is likely to be required and/or used by the HTML document (i.e., determination block 728="Yes"), in block 729, the CSS document scanner may request downloading of the resources corresponding to that CSS rule. In this manner, the number of false negatives caused by scanning the HTML document and the CSS documents at the same time may be minimized. In addition, the various aspects may decrease document load times (and hence, increase responsiveness) with little or no increase in data transfer costs, as well as less power consumption due to reduced utilization of the processor and network interface/radio.

Returning to FIG. 7A, when the CSS document scanner determines that retrieved information does not mark or identify an external resource as being required (or likely to be required) by the HTML document (i.e., determination block 728="No"), in block 721, the CSS document scanner may retrieve the next rule from memory. The operations of blocks 720-722 may be repeated until all the CSS rules stored in the memory by the HTML document scanner have been evaluated.

In various aspects, more precise heuristics than the CSS rule described above may be used by the HTML document scanner and/or CSS document scanner to improve performance. For example, in an aspect, the HTML document scanner may be configured to scan embedded JavaScript® code for URLs and/or commands that could modify the HTML document. Similarly, in an aspect, the CSS document scanner may be configured to record hierarchical information about the HTML tags associated with each encountered ID, which may allow the CSS document scanner to identify and reject more potential false positives.

In conventional browsers, the HTML parser is generally responsible for identifying all of the external resources and requesting them from severs via the network. As discussed above, when these resources are explicitly specified in the HTML document, various aspects may pre-fetch these resources and issue the request much earlier in the page load than conventional browsers. In addition, various aspects may pre-fetch and/or process the resources in parallel.

Software developers are increasingly using scripts (e.g., JavaScript® Code®) to dynamically determine the resources that are going to be required for a particular application-device combination (e.g., web browser-mobile device combination). For example, scripts may evaluate various factors relating to the client (e.g., browser) and computing device to identify the resources that are to be downloaded. Such scripts may essentially build a URL dynamically for a resource (e.g., images, CSS, other JavaScript®, etc.) based on the evaluated factors. Thus, an HTML document may require resources that are not explicitly identified in the HTML document, and which may only be determined by executing JavaScript® code included in the HTML document.

Since the JavaScript® code may change the state, behavior, and/or presentation of the containing HTML (and the HTML code itself), the HTML parser is required to execute the encountered JavaScript® code (or scripts) sequentially and/or by following ordering rules defined in the HTML specifications. For example, when an HTML parser encounters a script tag (i.e., a <script> tag used to define a client-side script, such as a JavaScript® script), the HTML parser has to wait for the script to be downloaded and executed before it may continue parsing the remaining portions of the HTML document. As a result, all resource requests may be serialized (i.e., required to be performed one after the other) within the execution of the JavaScript® script (i.e., JavaScript® code inside <script> tags). Also, it may be more difficult for the HTML document scanning operations (e.g., HTML pre-scanning operations 563, etc.) to statically predict the resources that are going to be required for proper rendering the webpage.

Various aspects may overcome these and other limitations by speculatively pre-fetching resources in a sandboxed JavaScript® engine 530, which enables the browser system 500 to discover and download resources not explicitly requested in the HTML document in parallel to other browser operations (e.g., HTML parsing) and other resource requests. These aspects may also enable the browser system 500 to execute multiple JavaScript® scripts in parallel without unintentionally modifying the browser state.

Various aspects may execute scripts (e.g., JavaScript® code) as soon as they are discovered, in parallel with other browser operations (e.g., HTML pre-scanning 563, HTML parsing 568, etc.) and/or other scripts. In order to avoid interfering with the normal processing of the webpage, the scripts may be executed in a sandboxed JavaScript® engine 530 that is isolated and/or separated from the other browser components (e.g., so as not to affect the operations of primary JavaScript® engine). Executing the scripts in a sandboxed JavaScript® engine 530 prevents the system from unintentionally modifying the browser state during the parallel execution of scripts. In an aspect, each script may be executed in a separate instance (e.g., thread) of the sandboxed JavaScript® engine 530.

Various aspects may modify the API between the browser client and the JavaScript® engine 530.

Generally, scripting engines (e.g., JavaScript® engine 514, 530, 558) provide bindings (i.e., API for mapping languages) to the browser API (i.e., interface that enables the scripts to invoke browser operations) to invoke browser operations (e.g., manipulating DOM, accessing network, etc.).

In an aspect, the JavaScript® engine 530 may monitor browser APIs that request resources from the network. The JavaScript® engine 530 may modify the bindings (or provide a separate set of bindings for the scripting engine) to cause the resource requests to be redirected to a different browser component, such as a pre-fetcher component. In this manner, the resource requests and/or collected information may be passed directly to the pre-fetcher component for further processing.

The sandboxed JavaScript® engine may scan through the JavaScript® code and execute only select portions of code and/or select operations most relevant to discovering external resources. Since the scanning operation is only concerned with discovering resources that the script may request, the scanning operation is not bound by the HTML specification rules, and does not have to run/execute all of the encountered code. By not fully executing all of the encountered code, the JavaScript® scanning operations may be performed quickly by the sandboxed JavaScript® engine.

The sandboxed JavaScript® engine may apply heuristics to further speed up the JavaScript® scanning operations. By way of example, such heuristics may include limiting the total execution time (e.g., spend a maximum of 10 ms per script or operation, etc.), the number of loop iterations (e.g., only process the first 10 iterations of a loop, etc.), the recursion depth, the supported features, abstract interpretation, etc.

Various aspects may limit the sizes of object and data structures (e.g., hash tables, arrays etc.) to further speedup the JavaScript® scanning operations, since such structures generally do not affect resource dependencies.

Software developers often use common patterns, frameworks, and/or services (herein collectively "patterns") in their code. Various aspects may detect such commonalities/patterns in the code (e.g. during parse, analyze, compile, etc.) and execute only the patterns (or portions of JavaScript® code identified by the patterns) relevant to discovering resources. In an aspect, instead of full compliance and conservative code generation, the sandboxed JavaScript® engine may be configured to target the most common patterns (e.g., via aggressive compiler optimizations). Patterns may be detected using a wide variety of known pattern recognition techniques, such as detecting keywords in the code (which is a relatively simple operation) and/or analyzing the structure of the page and/or script (which is relatively complex operation).

Figure 7B:
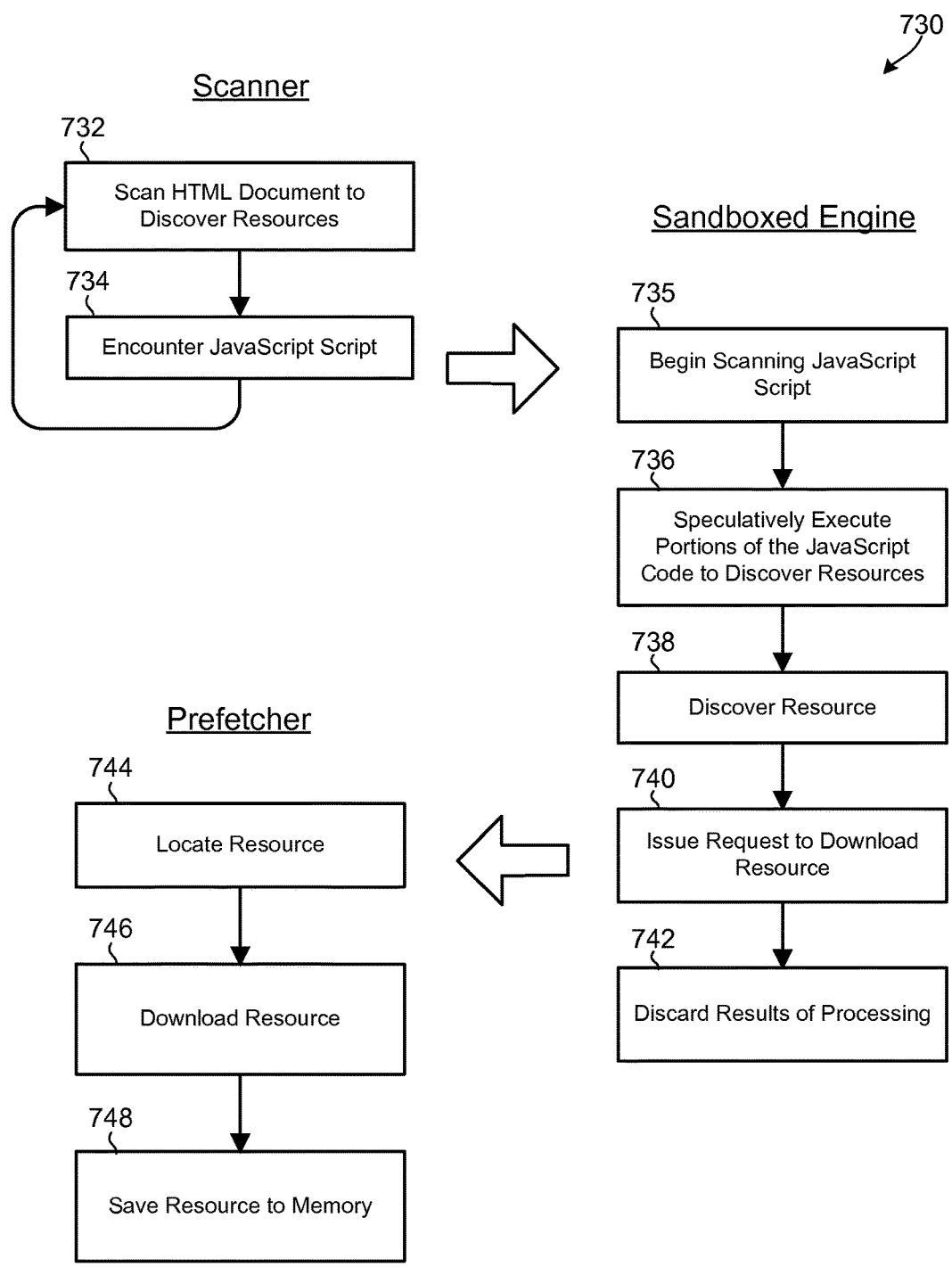
FIG. 7B is a process flow diagram illustrating an aspect browser method of speculatively pre-fetching resources in parallel.

FIG. 7B illustrates an aspect method 730 of speculatively pre-fetching resources in parallel by parallel processing of scripts in a sandboxed JavaScript® engine. The operations of method 730 may be performed in parallel with the other browser operations discussed herein.

In block 732 of method 730, an HTML document scanner (e.g., HTML pre-scanner 508) may begin scanning the HTML document for structural information and/or to discover resources. In block 734, the HTML document scanner may encounter a JavaScript® script, and send the encountered script (e.g., via a memory write operation, a redirected resource request, modified bindings, etc.) to a sandboxed JavaScript® engine to immediately execute the encountered script. In block 732, the HTML document scanner may continue to scan the HTML document for structural information and/or to discover resources. In an aspect, the HTML document scanner may generate (or spawn) the sandboxed JavaScript® engine in response to encountering the script.

In block 735, the sandboxed JavaScript® engine may begin scanning the script to discover resources. In block 736, the sandboxed JavaScript® engine may speculatively execute the script (or portions of JavaScript® code included in the script). The speculative execution of the script may include executing only the operations and/or portions of code most likely to be relevant to discovering external resources. In various aspects, the speculative execution operations may be performed in parallel with other browser operations (e.g., HTML pre-scanning 563, HTML parsing 568, etc.) and/or in parallel with the execution of other scripts (whether speculative or not).

In an aspect, the speculative execution of the script may include executing only the portions of JavaScript® code that correspond to a pattern relevant to discovering resources.

In an aspect, as part of block 736, the sandboxed JavaScript® engine may perform the speculative execution of the JavaScript® code based on heuristics (e.g., to reduce execution time). Such heuristics may include limiting the total execution time, number of loop iterations, recursion depth, supported features, and/or abstract interpretation of the code.

In an aspect, as part of block 736, the sandboxed JavaScript® engine may limit the sizes of data structures (e.g., hash tables, arrays etc.) generated from the speculative execution of the script. Complete data structures may not result in identifying further resources for downloading, so the processing time required to fully generate/populate large data structure can be bypassed.

In block 738, the sandboxed JavaScript® engine may discover a resource that is required in order to render the HTML document but that is not explicitly requested in the HTML document. In block 740, the sandboxed JavaScript® engine may inform (or spawn) a pre-fetcher to retrieve the discovered resource. In block 742, the sandboxed JavaScript® engine may discard the results of the processing performed in block 736.

In block 744, the pre-fetcher may locate the resources discovered by the sandboxed JavaScript® engine in block 738. In block 746, the pre-fetcher may download the located resource. In block 748, the pre-fetcher may save the downloaded resource to memory.

As discussed above, HTML code may both embed JavaScript® code (called "inline scripts") and include links to JavaScript® code (called "external scripts"). In order to correctly process an HTML document, both the inline and external scripts must be executed in a specific order defined by the HTML standards.

As multiple scripts are downloaded, parsed, analyzed, and compiled in parallel, the order in which the scripts become ready for execution may be different than the specific execution order defined by the HTML standards. If a script is not ready to execute, but is the next script in the specific execution order defined by the HTML standards, a browser may be required to wait until the script becomes ready for execution before performing any additional processing of the HTML document. Various aspects utilize this wait time to prepare other scripts or resources for execution (which is not regulated by the HTML standards). Multiple scripts and resources may be prepared in parallel and/or during the execution of other scripts.

In addition, not all of the scripts included (i.e., embedded or linked to) in an HTML document are actually executed, and preparing all the scripts for execution in advance may waste power and processing resources. Various aspects may intelligently select the scripts that are to be prepared for execution.

By way of example, an HTML pre-fetcher may discover and download all referenced scripts (out-of-order) and an HTML parser may later orchestrate their execution in the correct order, and at the correct point in time of processing the HTML document.

The final execution order of the scripts must generally be maintained. However, all operations associated with downloading, parsing, analyzing, and compiling the scripts may be performed in parallel and/or out of order.

In an aspect, scripts included in an HTML document may be prepared for execution in parallel (i.e., with respect to each other) and out-of-order (i.e., with respect to the specific execution order defined by the HTML standards). This may be achieved by generating and/or associating a unique identifier and/or signature with each script. Signatures may be based on the content of the script. Examples of signatures and signing processes suitable for use in various aspects include file offsets (for inline scripts), a message-digest algorithm (e.g., MD5), a secure hash algorithm (SHA), URL of the script, URI of the script, browser cache keys, and/or any of a variety of known signing processes.

Figure 7C:
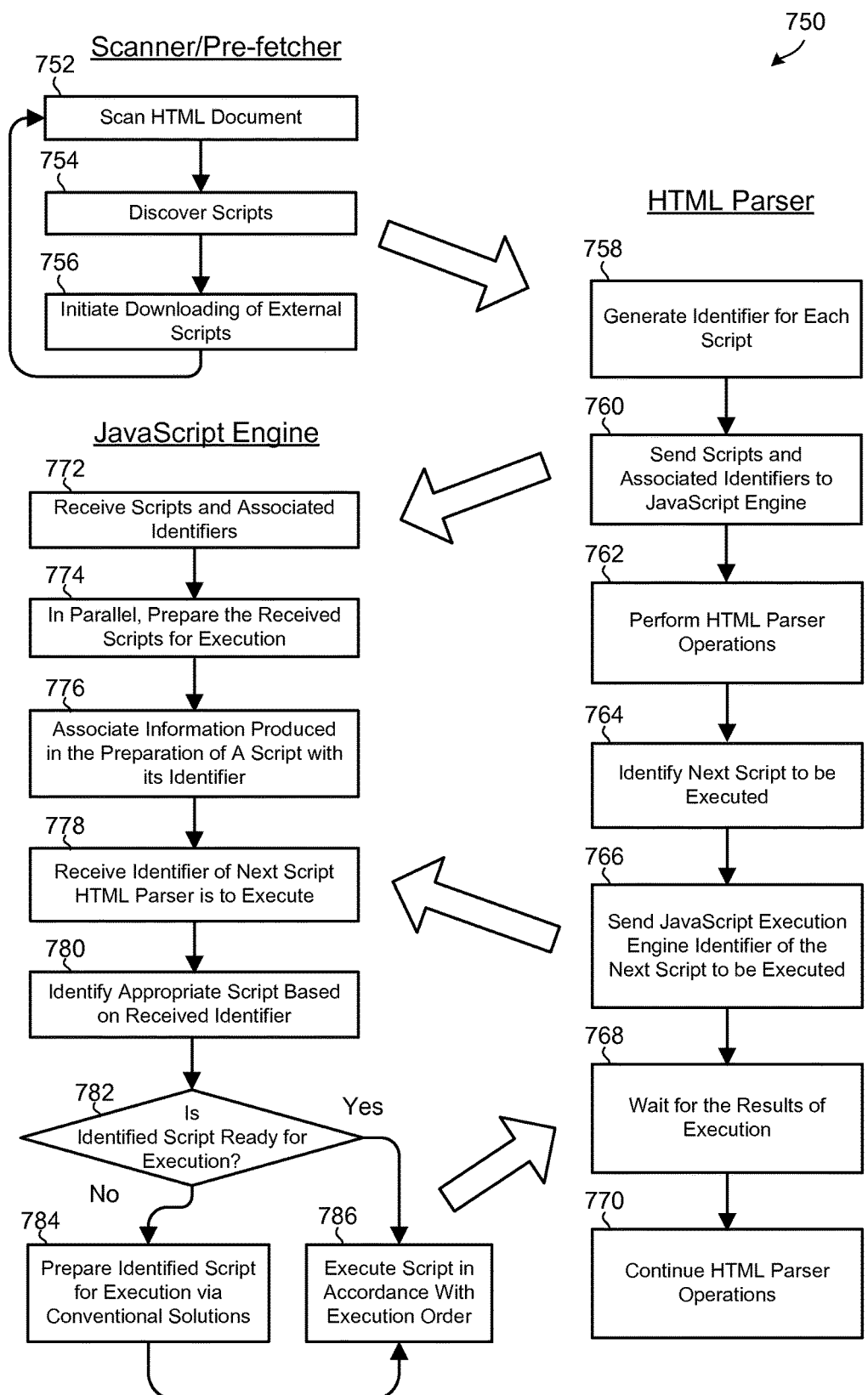
FIG. 7C is a process flow diagram illustrating an aspect browser method of preprocessing scripts in parallel.

FIG. 7C illustrates an aspect browser method 750 of intelligently preparing scripts included in an HTML document for parallel execution. The operations of method 750 may be performed by a processor in parallel with the other browser operations.

In block 752, an HTML scanner/pre-fetcher may scan an HTML document for structural information and/or to discover resources (images, CSS, scripts, etc.). In block 754, the HTML scanner/pre-fetcher may discover one or more scripts in an HTML document, and inform an HTML parser (executing in parallel with the HTML scanner) of the discovered scripts. In block 756, the HTML scanner/pre-fetcher may initiate the downloading of external scripts.

In block 758, the HTML parser may generate an identifier (or signature) for each discovered script (both inline and external scripts) and/or associate each discovered script with an identifier. In an aspect, the HTML parser may set the text of the discovered script as its identifier. In an aspect, the HTML parser may associate the URL/URI of external scripts with the external scripts (i.e., may set their URL/URI as their signature), and perform a digest and/or hash algorithm to compute signatures for the inline scripts. If the URL/URI of a script is not available, not unique and/or otherwise does not uniquely identify a script, as part of block 758, the HTML parser may generate and use a signature to identify that script.

In block 760, the HTML parser may send the scripts and their associated identifiers or URL/URI to a JavaScript® engine executing in parallel with the HTML parser (e.g., in a separate thread). In block 762, the HTML parser may perform various HTML parser operations, such as parsing the HTML to discover other scripts.

In block 772, the JavaScript® engine may receive the scripts and associated identifiers, signatures, or URL/URI from the HTML parser. In block 774, the JavaScript® engine may prepare (e.g., parse, analyze, and/or compile) the received scripts for execution. The preparation operations may be performed out of order and/or in parallel across all received scripts (i.e., multiple scripts may be prepared at once). In an aspect, as part of block 774, the JavaScript® engine may employ heuristics (e.g., via abstract interpretation) to detect the call graph without executing code, identify the scripts (or functions) that are most likely to be executed based on the call graph, and prepare for execution only scripts determined likely to be executed. In block 776, the JavaScript® engine may associate information generated during the preparation of a script (e.g., compiled code, etc.) with that script's identifier, signature or URL/URI.

In block 764, the HTML parser may identify the next script to be executed (e.g., based on the execution order defined by the HTML standards). In block 766, the HTML parser may send an identifier (e.g., text of the script, signature, URL/URI, etc.) of the next script to be executed to the JavaScript® engine. In block 768, the HTML parser may wait of the result of the execution or a notification that the script has been executed. In block 770, the HTML parser may continue performing HTML parser operations.

In block 778, the JavaScript® engine may receive the identifier, signature, or URL/URI from the HTML parser. In block 780, the JavaScript® engine may identify the appropriate script based on the received identifier, signature or URL/URI. In determination block 782, the JavaScript® engine may determine whether the identified script is ready for immediate execution by, for example, determining whether all of the parsing, analyzing, and compiling operations have been performed for that script. If the JavaScript® engine determines that the script is ready for immediate execution (i.e., determination block 782="Yes"), in block 786, the JavaScript® engine may inform the HTML parser of the results of the execution or that the execution is complete.

When it is determined that the script is not yet ready for immediate execution (i.e., determination block 782="No"), in block 784, the JavaScript® engine may prepare the script for execution using conventional solutions. In block 786, the JavaScript® engine may execute the script in accordance with the specific execution order defined by the HTML standards. In this manner, method 750 prepares the scripts included in an HTML document for execution in parallel (i.e., with respect to each other) and out-of-order (i.e., with respect to the specific execution order defined by the HTML standards), and the scripts are executed in the order defined by the standards.

Figure 8:
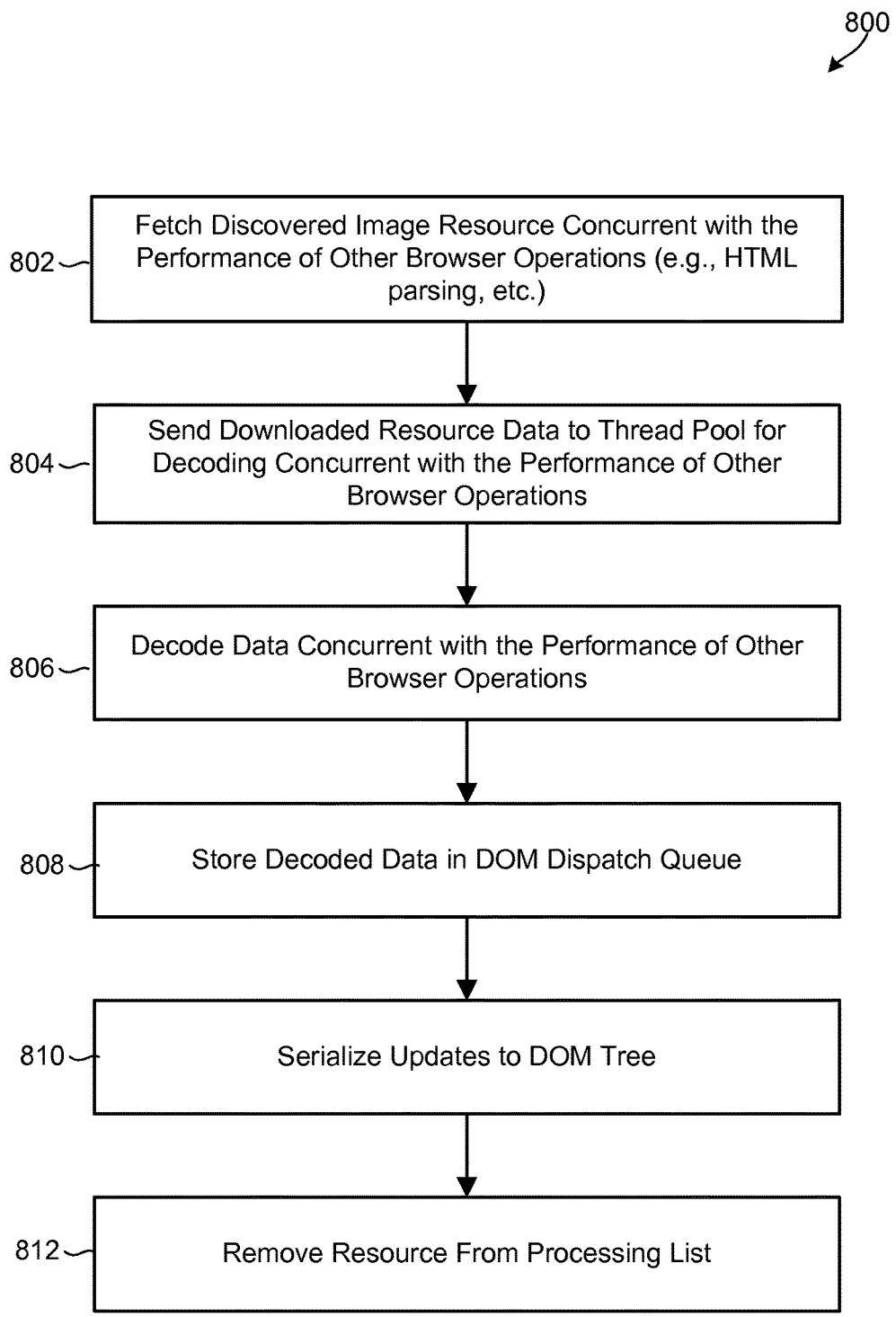
FIG. 8 is a process flow diagram illustrating an aspect browser method of processing pre-fetched resources.

FIG. 8 illustrates an aspect browser method 800 of processing pre-fetched resources. In block 802, a web browser component (e.g., via the fetch manager 502) may initiate the downloading of a discovered resource (e.g., an image), which may be downloaded/fetched concurrently (or in parallel) with the performance of other browser operations (e.g., HTML parsing, etc.). When all data associated with the discovered resource is downloaded and/or received, in block 804, the downloaded data (e.g., image data) may be sent to a thread pool for decoding. In an aspect, the decoding operations may be performed concurrently with other browser operations.

In block 806, the downloaded data (e.g., image data) may be decoded. In block 808, the decoded data may be added to a DOM dispatcher queue. In block 810, a DOM dispatcher component 504 may serialize updates to the DOM tree and respective tree nodes (e.g., "img" tree node in the case of image data). In block 812, the resource (e.g., image) may be removed from a processing list (e.g., list of pending images).

Figure 9:
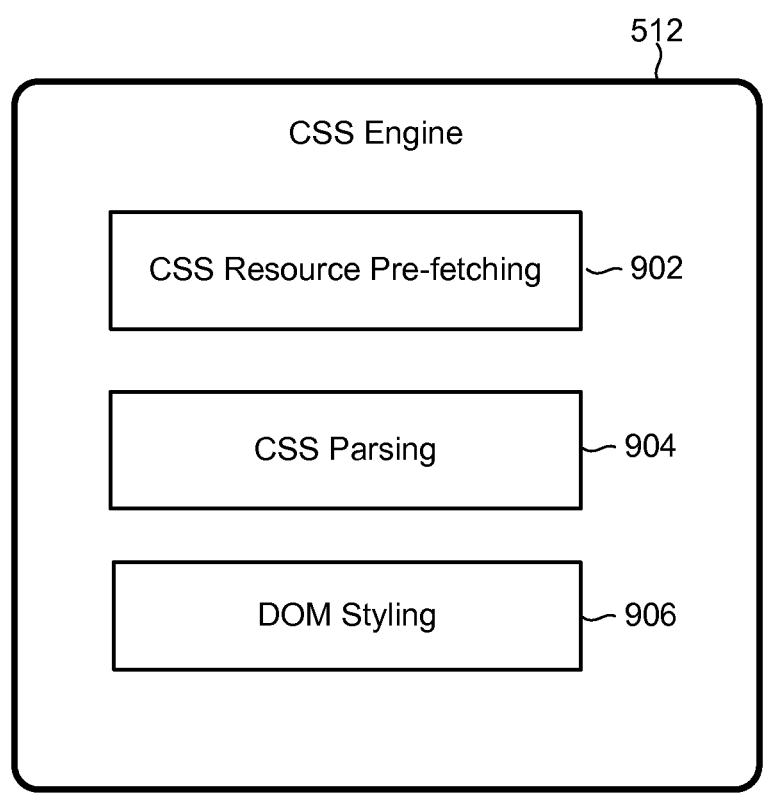
FIG. 9 is a function block diagram illustrating example functional components in CSS engine suitable for use with the various aspects.

FIG. 9 illustrates example components in a CSS engine 512 suitable for use with the various aspects. The CSS engine 512 may be configured to perform three main categories of operations: CSS resource prefetching operations 902, CSS parsing operations 904, and DOM styling operations 906.

CSS parsing operations 904 may include reading the CSS code and creating a collection of data structures (e.g., CSS rules) in memory. The CSS code may be embedded in HTML or linked as separate files, and may be stored in different servers. Traditional CSS engines (e.g., the ones in WebKit or Firefox) may parse CSS sequentially in the main browser thread. Thus, if a page uses embedded CSS, the HTML parser cannot parse the rest of the HTML document until the CSS engine has parsed the style element in the document's header. If a page uses several CSS files, they will all be parsed sequentially, even though there may be underutilized CPU cores. Such CSS parsing serialization (i.e., serial processing of CSS documents) may cause severe slowdowns if the site uses large CSS files. The various aspects may use asynchronous tasks to avoid CSS parsing serialization.

Referring to FIG. 9, the HTML parser 506 may be configured to spawn a CSS parsing 570 task for each style element in the DOM tree during a page load operation. Similarly, the fetch manager 502 may spawn a CSS parsing 570 task whenever a new CSS file arrives. As a result, multiple CSS parsing 570 tasks may execute concurrently with the HTML parser 506 and/or HTML parsing operations 568.

Because the total order of style sheets (CSS) and rules (CSS rules) may be a key part of the styling operations 574, the browser system 500 may be configured to ensure that the total order is the same, as if the all the style sheets (CSS) had been parsed in the order in which the programmer intended.

In various aspects, each of the parsing tasks or parsing operations 568, 570 may receive a unique, sequential parser ID. The browser system 500 may then use that ID to recreate the ordering of the style sheets in the document.

DOM styling operations 906 may enable the CSS engine 512 to use data structures created by the CSS parser 522 to determine the style of the nodes in the DOM tree. For each node, the CSS engine 512 may perform rule matching operations to find all rules whose selectors match the node. Rule matching generally returns many (and sometimes conflicting) rules per node. Using cascading, the CSS engine 522 may assign weights to rules and choose the rules with the greatest weight.

The last step in styling a node may include the DOM styling operations 906 creating a style data structure by using the rules selected by the cascading algorithm and attaching it to the DOM. The rule matching and cascading operations may be performed on several nodes in parallel, as long as certain dependencies are enforced.

The various aspects may respect/enforce existing HTML and Javascript semantics during concurrent execution (or overlapping) of multiple browser operations and/or passes. A DOM tree may be the main data structure used by all browser passes. In various aspects, access to the DOM tree (which may be constructed by the HTML5 parser) may be serialized to conform to the HTML5 specification. In addition, to allow for greater parallelism, each passes may be provided access to a private concurrent data structure (i.e., in addition to the DOM tree). In an aspect, this additional data structure may be a layout tree.

Figure 10:
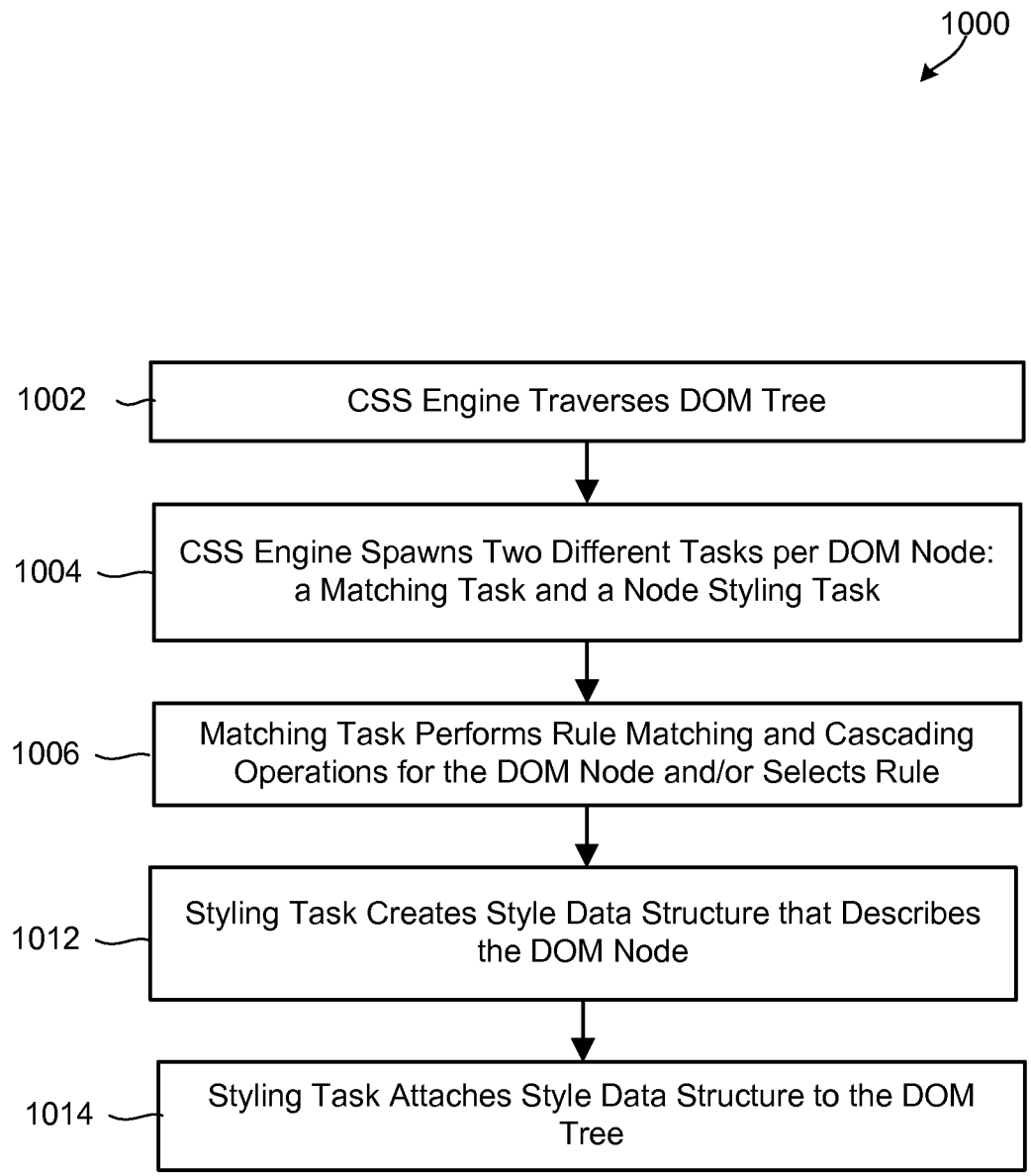
FIG. 10 is a process flow diagram illustrating an aspect styling method for performing rule matching and cascading operations on several nodes in parallel.

FIG. 10 illustrates an embodiment parallel DOM styling method 1000 in which rule matching and cascading operations are performed on several nodes in parallel. In block 1002, the CSS engine 512 may traverse the DOM tree and spawn two different tasks per DOM node: a matching task, and a node styling task. In block 1004, the matching task may perform rule matching and cascading operations for the DOM node. In block 1006, the styling task may create the style data structure that describes the DOM node. In block 1008, the styling task may attach the style data structure to the DOM tree.

Figure 11A:
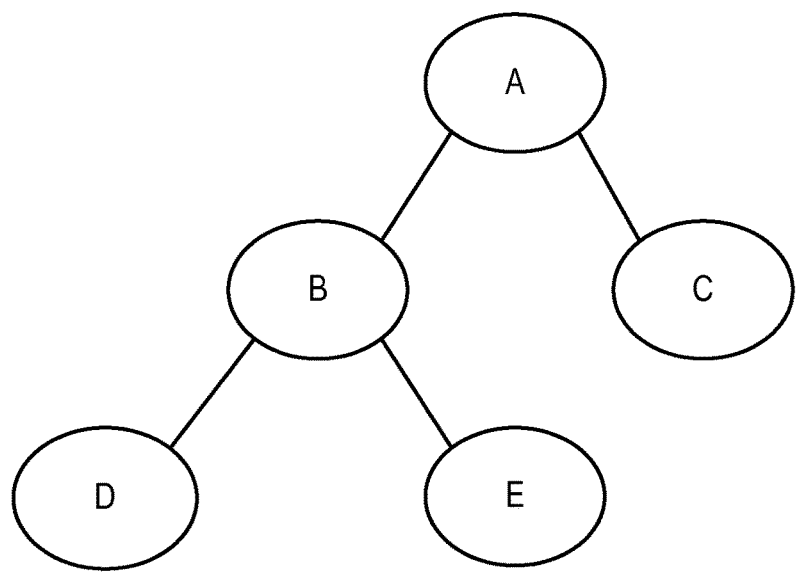
FIG. 11A is an illustration of an example document object model (DOM) tree suitable for use in various aspects.
Figure 11B:
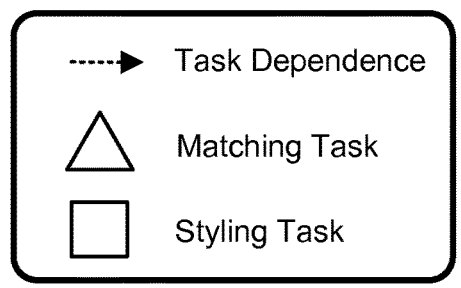
FIG. 11B is an illustration of a task directed acyclic graph (DAG) corresponding to the DOM tree illustrated in FIG. 11A.
Figure 11B:
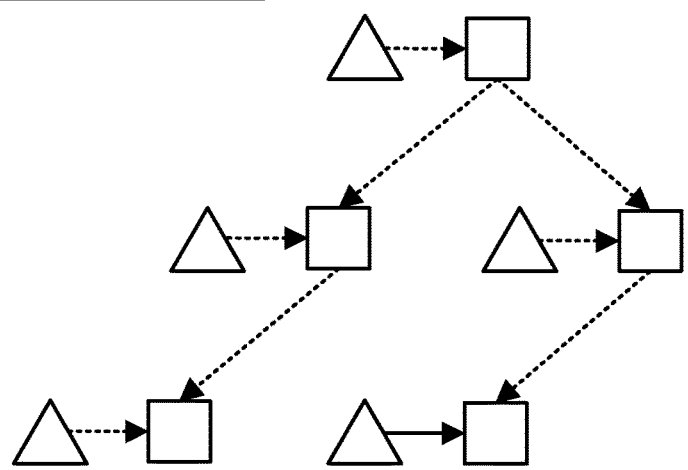

FIG. 11A illustrates an example DOM tree suitable for use in various aspects. FIG. 11B illustrates an example task directed acyclic graph (DAG) corresponding to the example DOM tree illustrated in FIG. 11A. Specifically, FIG. 11B illustrates how the matching tasks (represented as triangles) may be completely independent of each other and of the styling tasks (represented as squares), whereas the styling tasks are dependent on each other and the matching tasks. Generally, parallel execution of the matching tasks is only limited by the number of processing cores in the computing system.

As mentioned above, styling tasks may be dependent on each other and/or the matching tasks. Each styling task may be required to satisfy two dependencies before it can execute. First, a styling task may only execute after the matching task working on the same node has completed execution. This is because the styling task builds the style data structure using the rules selected by the matching task. Second, a styling task working on a node may only execute after the styling task working on the node's parent has completed execution. This is because some of the node's style properties may inherit from its parent's. For example, the CSS code p {color: inherit} instructs the browser to render <p> nodes using the same foreground color as their parents.

The rule matching operations performed by the matching tasks may be expensive in terms of computation, power, latency, etc. For example, if the CSS engine 512 needs to determine whether the rule "h1 p div {color:red}" applies to a <div> element E, the matching algorithm may need to find if any of E's ancestors is a <p> element, and whether any of <p>'s ancestors is a <h1> element. This may require walking up the DOM tree all the way to the root, which may be an expensive operation. In addition, a typical website may require more than 400,000 of such DOM tree walks.

To reduce the number of DOM tree walks, various aspects may include a bloom filter that stores information about the ancestors of a DOM node. The bloom filter may reduce the number of DOM tree walks to the root (A) by 90%, halving the time spent in the styling algorithm.

A bloom filter may be a large data structure, and the CSS engine 512 may be required to copy it for each styling task. Since copying costs may far outweigh the performance gains, various aspects may use a smaller structure than a bloom filter. This may improve browser performance by reducing the number of copy operations and/or reducing the size of the elements copied.

As described above, various aspects may use element id and class attributes to predict whether an image referenced in the CSS file should be prefetched. In an aspect, these elements and attributes may be stored in a database that records how many times each of them appears in the document. The HTML parser may also add information to this database.

Before the rule matching algorithm starts, the CSS engine 512 may sort the items in the database according to their frequency. The browser system 500 may then assign a bit to each item in a bitmap data structure (referred to as "matching bitmaps"). If the number of ids and classes is larger than the bitmap size, a single bit may be assigned to multiple items. Since these bitmaps are small, they may be copied many times without significantly impacting the performance of the computing device.

During rule matching operations, each styling task may receive a matching bitmap from its parent. The matching bitmap may record the ids, classes, and tags of its ancestors. Styling tasks may use the matching bitmap to filter out rules that could never match. Afterward, the styling tasks may add their node's id, class, and tag to it and send a copy to their descendants. On average, such matching bitmaps avoid 90% of the walks to the root of the DOM tree, with only 0.024% of false positives.

False positives may occur because matching bitmaps do not record the order in which labels and ids are encountered. For example, to determine whether the rule "h2 h1 p {color: red}" applies to a certain node <p>, and that the matching bitmap indicates that both <h1> and <h2> are <p>'s ancestors, the browser system 500 may be required to walk up the DOM tree to check whether <h2> is <h1>'s ancestor. If that is not the case, then it is a false positive situation. Such false positives may not cause the page to render incorrectly, but may waste CPU cycles.

In an aspect, layout and rendering operation, such as by a rendering engine subsystem 560, may include performing computations that transform a styled DOM into a bitmap image for display on the screen. The DOM and the CSS styles applied to the bitmap image may be combined to form a new tree structure (called a layout tree), in which each node represents a visual element on the web page. Each DOM node may be translated into zero, one, or many layout tree nodes. The rendering engine subsystem 560 may take a layout tree as input and compute the region of the page that each element occupies. The style of each element may be viewed as a constraint for layout (e.g., inline/block display, float, width, height, etc.).

The rendering engine subsystem 560 may traverse the layout tree and solve the constraints (e.g., as part of the layout operations 582) to determine the final width, height, and position of each element. The rendering engine subsystem 560 may also walk (e.g., as part of the rendering operations 584) over the layout tree (which may be annotated with the results of the layout engine's computations) and draw it on the screen according to the rules of CSS.

Since the layout operations 582 and rendering operations 584 are closely related and operate together in a pipeline fashion, in an aspect, they may be performed by a single component, such as the layout and rendering engine 516.

In various aspects, the rendering engine subsystem 560 may be configured to perform the layout operations 582 such that the CSS layout algorithm is performed in four passes over the layout tree. In each pass, information may flow through the tree in a more controlled way than in conventional approaches, exposing the potential for parallelism in the layout process.

In an aspect, the rendering engine subsystem 560 may perform four passes on the layout tree: a minimum or preferred width calculation pass, a width calculation pass, a block-formatting context flow pass, and an absolute position calculation.

The first pass (i.e., the minimum or preferred width calculation pass) may be a bottom-up pass that propagates widths up the tree to assign a minimum width and a preferred width to each element. By way of example, for a div element containing a paragraph of text, the minimum width may be the width as a line break placed after each word, and the preferred width may be the width without any line breaks.

The second pass (i.e., the width calculation pass) may be a top-down pass that calculates the final width of each element. Depending on the style of the element, the final width may be derived from either its parent's width, or the minimum/preferred width.

During the third pass (i.e., the block-formatting context flow pass), each element has a known width, and it its contents may be used to calculate its height. By way of example, for a div element containing a paragraph of text, after the width is determined, the text may be placed inside of it, and the height of each line may be summed to find the total height of the div. The direction of propagation may be complex. Elements whose contents are used to calculate its height may be referred to as block-formatting contexts (BFCs). Whether an element is a block-formatting context or not may be determined by its CSS style.

The block-formatting context elements in the DOM tree may form a logical tree that may be overlaid onto the DOM. The block-formatting context overlay tree may be walked bottom-up, and by the time the browser system 300 reaches the root of the DOM tree, it will have laid out the whole webpage. At the end of this phase, the browser system 500 will be informed of the height of all elements, as well as their relative positions within the block-formatting context that contains them.

The fourth pass (i.e., the absolute position calculation pass) may be a top down pass that uses the relative positions within each block-formatting context from the prior pass to calculate the absolute position of each element on the page.

In an aspect, rendering may be achieved by walking the layout tree so that background elements are visited before foreground elements. Various aspects may draw each element into a graphics buffer in a manner consistent with its style, and display the contents of the buffer on the screen (e.g., via the GUI). These rendering operations may be computationally expensive because of the memory bandwidth used by the compositing steps. Various aspects may be configured to reduce the memory bandwidth required by each compositing step via parallelism or concurrent execution of the various components/subsystems.

Generally, the performance of the layout and rendering operations are important due to their impact on everything from page load times to the responsiveness of the user interface. In addition, layout and rendering operations compete for CPU cycles with other important tasks, like executing JavaScript.

Along with sequential optimizations, various aspects may include both coarse and fine-grained parallelism to improve the performance of the layout and rendering engine. These two approaches may be complementary. At the coarse level, an aspect browser may move as much work as possible out of the critical path and into worker threads. At the fine level, the aspect browser may parallelize the layout and rendering algorithms/methods.

In a conventional web browser, tasks that manipulate the DOM (e.g. parsing or JavaScript) never execute at the same time as layout and rendering tasks, which ensures that the two do not interfere with each other. In contrast, various aspects overlap these two types of tasks. As such, in various aspects, the layout tree may not be updated every time the DOM changes.

Various aspects may separate (or keep separate) the layout tree and the DOM. Updates to the layout tree may be performed as a batch operation at times when layout and rendering operations would normally occur; often this is after a parsing or JavaScript execution task completes. Grouping the updates in this manner may mean that that the browser system 500 may be required to maintain additional state information to identify portions of the DOM that have changed, but would avoid performing unnecessary work since the layout tree is not updated for each intermediate state of the DOM.

Various aspects may update the layout tree when it is ready to do useful work with the results. The layout tree may be a separate entity from the DOM. All DOM changes may be performed without affecting the layout tree. Conversely the rendering engine subsystem 560 does not need to access the DOM in any way once the layout tree is updated. This enables parallelism, and also means that the layout tree must duplicate certain information that would conventionally be stored only in the DOM. In particular, the layout tree may contain direct references to text, images, CSS styles, and HTML canvas elements.

Text and images may be immutable and shared with the DOM safely. CSS styles may be logically immutable, but the amount of data in a CSS style object may be too large (and/or they may be updated too frequently) to copy the entire object every time. Thus, in an aspect, each style object may be divided internally into many smaller sub-style objects. Shared sub-styles may be updated using a copy-on-write approach. Unshared sub-styles may be updated in place. Accordingly, copying a style object may only require creating a new style object that shares the same sub-styles, which may be much cheaper. In addition, the sub-styles may be grouped so that CSS properties that are updated together are in the same sub-style, which may minimize sub-style copies when updates occur. This arrangement allows the DOM, layout, and rendering components to reference the same CSS styles without changes made in one place/component being visible to the others. A similar copy-on-write approach may be used for HTML canvas elements.

The separation of the layout tree from the DOM tree enables the coarse-grained parallelism in the rendering engine subsystem 560. When a web page is ready to be displayed for the first time to the user, the browser system 500 may create a work item that initializes the layout tree and hands it off to the rendering engine subsystem 560 for processing. The separation of the layout and rendering operations into different threads allows the rest of the browser system 500 to move forward, such as JavaScript can be executed, user interface (UI) events can be processed, and CSS styling can be computed, etc.

When the rendering engine subsystem 560 finishes its tasks and displays the page on the screen, it may submit a "LR work item," to update the layout tree, and start the process all over again. Only the "LR work item" needs exclusive access to the DOM, and once the tree is updated, the other operations may be performed in parallel and/or asynchronously.

Certain JavaScript DOM APIs (e.g., getComputedStyle and offsetTop) may require information about the results that the layout algorithm computes. The rendering engine subsystem 560 may be required to pause until the results are available. If the rendering engine subsystem 560 performs the layout in the main thread, it may duplicate computations being performed in the LR work item (or LR thread), which may waste time and energy.

In an aspect, the rendering engine subsystem 560 may be configured to remember whether the layout tree has up-to-date layout information. If so, a synchronous layout request may be returned immediately. If not, the layout operations may be performed in the LR thread as normal, and the rendering engine subsystem 560 may be requested to notify the main thread when the layout process is complete. This delivers the needed results as quickly as possible while preventing duplicate work.

In addition to parallelism, another advantage of separating the layout tree and the DOM is that the rendering engine subsystem 560 may be treated as a service shared between web pages. Since layout trees don't refer back to the DOM they were constructed from, the same rendering engine subsystem 560 may manage all layout trees, regardless of their source. This means that expensive, finite rendering related resources like graphics buffers only need one instance in the entire browser system 500.

Yet another advantage provided by the layout tree is added flexibility in determining a user's intent when the user interacts with a page that is changing rapidly. For example, if a user clicks on a button that is being moved around the screen by JavaScript, there is a delay between JavaScript changing the DOM and the results appearing on the screen because layout and rendering operations take time. By the time the user's click is registered, the DOM may have been updated and the box's location from the browser's perspective may have changed. Even if the user's mouse pointer is directly over the box, the attempt to click may not be successful. However, because the layout tree is separate from the DOM, the browser system 500 may have access to the current working tree and the last tree that was displayed on the screen. This enables the browser system 500 to determine the object that the user intended to click on based upon what they saw when they clicked, and not the current state of the DOM, resulting in improved perceived responsiveness and a better user experience.

Figure 12:
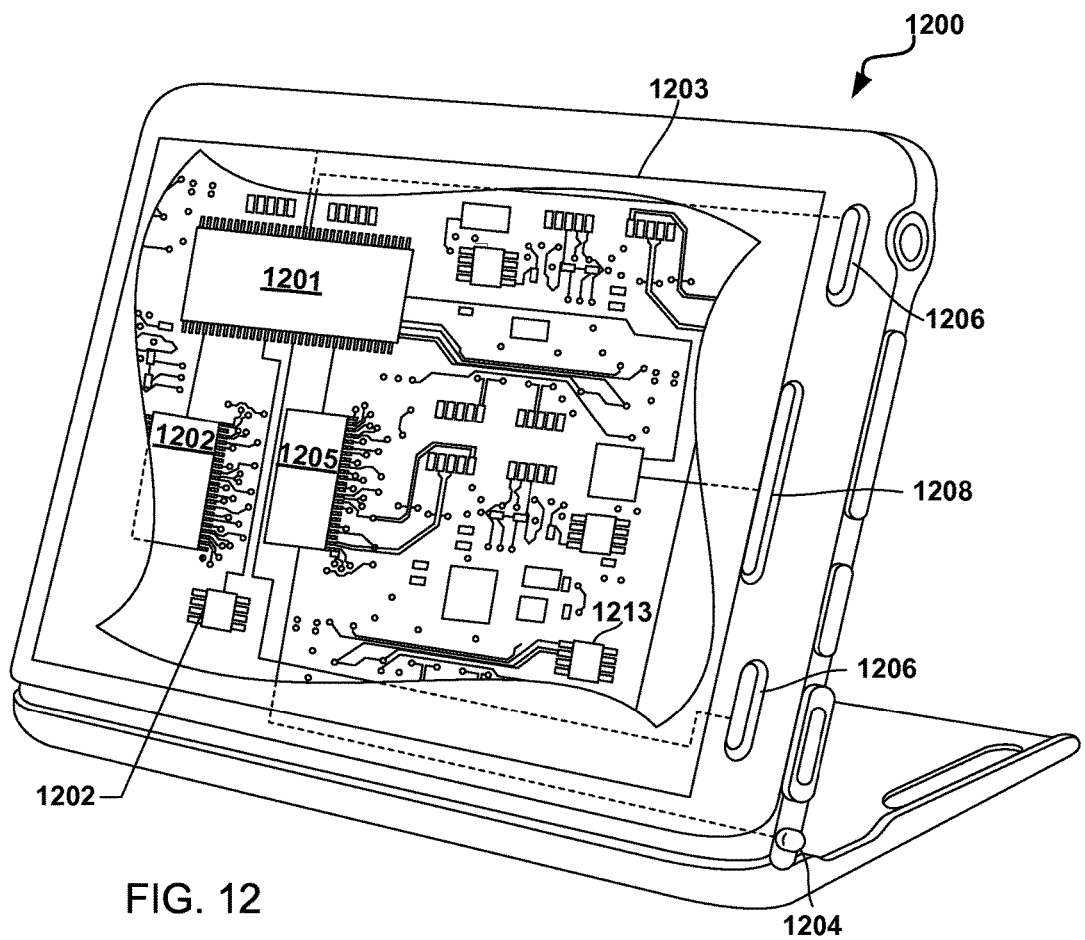
FIG. 12 is a component block diagram of an example mobile device suitable for use with the various aspects.

The various aspects may be implemented on a variety of mobile computing devices, an example of which is illustrated in FIG. 12. Specifically, FIG. 12 is a system block diagram of a mobile transceiver device in the form of a smartphone/cell phone 1200 suitable for use with any of the aspects. The cell phone 1200 may include a processor 1201 coupled to internal memory 1202, a display 1203, and to a speaker 1208. Additionally, the cell phone 1200 may include an antenna 1204 for sending and receiving electromagnetic radiation that may be connected to a wireless data link and/or cellular telephone transceiver 1205 coupled to the processor 1201. Cell phones 1200 typically also include menu selection buttons or rocker switches 1206 for receiving user inputs.

A typical cell phone 1200 also includes a sound encoding/decoding (CODEC) circuit 1213 which digitizes sound received from a microphone into data packets suitable for wireless transmission and decodes received sound data packets to generate analog signals that are provided to the speaker 1208 to generate sound. Also, one or more of the processor 1201, wireless transceiver 1205 and CODEC 1213 may include a digital signal processor (DSP) circuit (not shown separately). The cell phone 1200 may further include a ZigBee transceiver (i.e., an IEEE 802.15.4 transceiver) 1213 for low-power short-range communications between wireless devices, or other similar communication circuitry (e.g., circuitry implementing the Bluetooth® or WiFi protocols, etc.).

Figure 13:
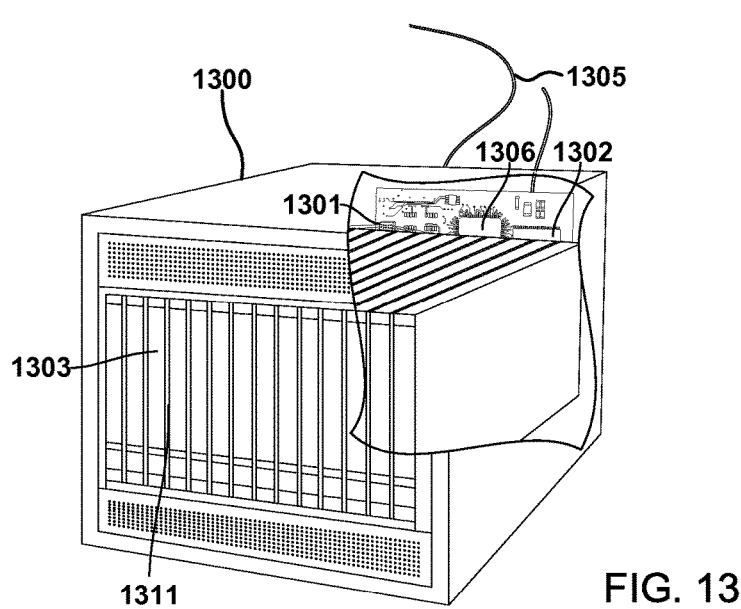
FIG. 13 is a component block diagram of an example server suitable for use with various aspects.

Various aspects may be implemented on any of a variety of commercially available server devices, such as the server 1300 illustrated in FIG. 13. Such a server 1300 typically includes a processor 1301 coupled to volatile memory 1302 and a large capacity nonvolatile memory, such as a disk drive 1303. The server 1300 may also include a floppy disc drive, compact disc (CD) or DVD disc drive 1311 coupled to the processor 1301. The server 1300 may also include network access ports 1306 coupled to the processor 1301 for establishing data connections with a network 1305, such as a local area network coupled to other communication system computers and servers.

Figure 14:
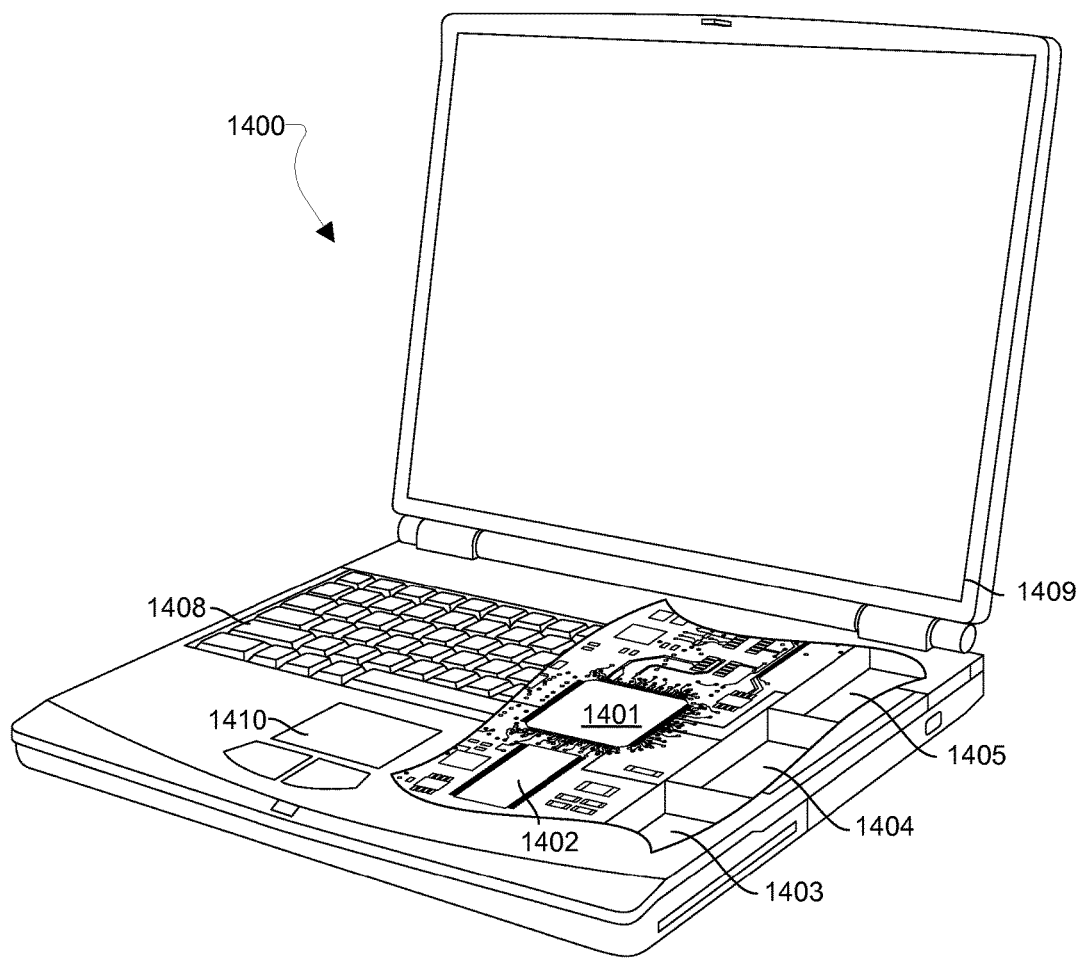
FIG. 14 is a component block diagram of a lap top computer suitable for implementing the various aspects.

Other forms of computing devices may also benefit from the various aspects. Such computing devices typically include the components illustrated in FIG. 14 which illustrates an example personal laptop computer 1400. Such a personal computer 1400 generally includes a processor 1401 coupled to volatile memory 1402 and a large capacity nonvolatile memory, such as a disk drive 1403. The computer 1400 may also include a compact disc (CD) and/or DVD drive 1404 coupled to the processor 1401. The computer device 1400 may also include a number of connector ports coupled to the processor 1401 for establishing data connections or receiving external memory devices, such as a network connection circuit 1405 for coupling the processor 1401 to a network. The computer 1400 may further be coupled to a keyboard 1408, a pointing device such as a mouse 1410, and a display 1409 as is well known in the computer arts.

The processors 1201, 1301, 1401 may be any programmable microprocessor, microcomputer or multiple processor chip or chips that can be configured by software instructions (applications) to perform a variety of functions, including the functions of the various aspects described below. In some mobile devices, multiple processors 1301 may be provided, such as one processor dedicated to wireless communication functions and one processor dedicated to running other applications. Typically, software applications may be stored in the internal memory 1202, 1302, 1303, 1402 before they are accessed and loaded into the processor 1201, 1301, 1401. The processor 1201, 1301, 1401 may include internal memory sufficient to store the application software instructions.

The various aspects may be implemented in any number of single or multi-processor systems. Generally, processes are executed on a processor in short time slices so that it appears that multiple processes are running simultaneously on a single processor. When a process is removed from a processor at the end of a time slice, information pertaining to the current operating state of the process is stored in memory so the process may seamlessly resume its operations when it returns to execution on the processor. This operational state data may include the process's address space, stack space, virtual address space, register set image (e.g. program counter, stack pointer, instruction register, program status word, etc.), accounting information, permissions, access restrictions, and state information.

A process may spawn other processes, and the spawned process (i.e., a child process) may inherit some of the permissions and access restrictions (i.e., context) of the spawning process (i.e., the parent process). A process may be a heavy-weight process that includes multiple lightweight processes or threads, which are processes that share all or portions of their context (e.g., address space, stack, permissions and/or access restrictions, etc.) with other processes/threads. Thus, a single process may include multiple lightweight processes or threads that share, have access to, and/or operate within a single context (i.e., the processor's context).

The foregoing method descriptions and the process flow diagrams are provided merely as illustrative examples and are not intended to require or imply that the blocks of the various aspects must be performed in the order presented. As will be appreciated by one of skill in the art the order of blocks in the foregoing aspects may be performed in any order. Words such as "thereafter," "then," "next," etc. are not intended to limit the order of the blocks; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm blocks described in connection with the aspects disclosed herein may be implemented as electronic hardware, computer software, or combinations of both. To clearly illustrate this interchangeability of hardware and software, various illustrative components, blocks, modules, circuits, and blocks have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some blocks or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed aspects is provided to enable any person skilled in the art to make or use the present invention. Various modifications to these aspects will be readily apparent to those skilled in the art, and the generic principles defined herein may be applied to other aspects without departing from the spirit or scope of the invention. Thus, the present invention is not intended to be limited to the aspects shown herein but is to be accorded the widest scope consistent with the following claims and the principles and novel features disclosed herein.

What is claimed is:

1. A method of pre-fetching resources, comprising:
   scanning an HTML document to discover a script by an HTML document scanner executing in a processor of a computing device;
   invoking a script execution engine and spawning a sandboxed script execution engine in response to the HTML document scanner discovering the script, wherein:
   the script execution engine:
      commences compiling and executing the discovered script on the computing device concurrent with execution of the HTML document scanner and the sandboxed script execution engine; and
   the sandboxed script execution engine:
      executes on the computing device concurrent with the execution of the HTML document scanner and the script execution engine;
      selects operations in the discovered script that are relevant to discovering external resources; and
      executes only the selected operations to discover resources that are not expressly referenced in the discovered script or in the HTML document;
   pre-fetching the resources by the sandboxed script execution engine issuing a request to a pre-fetcher to download the discovered resources that are not expressly referenced in the discovered script or in the html document, wherein pre-fetching the resources includes the sandboxed script execution engine pre-fetching a resource in parallel with the script execution engine executing a different script and concurrent with an execution of a browser operation; and
   discarding results generated via the sandboxed script execution engine executing the selected operations of the discovered script.

2. The method of claim 1, wherein the sandboxed script execution engine executes at least one of the selected operations to discover a resource that is required to render the HTML document on an electronic display of the computing device.

3. The method of claim 1, wherein the sandboxed script execution engine executes at least one of the selected operations in parallel with an execution of a browser operation.

4. The method of claim 1, wherein the sandboxed script execution engine executes at least one of the selected operations in parallel with the script execution engine executing a different script and concurrent with an execution of a browser operation.

5. The method of claim 1, wherein the sandboxed script execution engine executes only the selected operations that correspond to a pattern identified as being relevant to discovering the external resources.

6. The method of claim 1, wherein the sandboxed script execution engine executes the selected operations based on heuristics.

7. The method of claim 1, further comprising:
   limiting a size of data structures generated from executing the selected operations.

8. A computing device, comprising:
   means for scanning an HTML document to discover a script by an HTML document scanner executing in a processor of the computing device;
   means for invoking a script execution engine and spawning a sandboxed script execution engine in response to the HTML document scanner discovering the script, wherein:
   the script execution engine includes:
      means for commencing compilation and execution of the discovered script on the computing device concurrent with execution of the HTML document scanner and the sandboxed script execution engine; and
   the sandboxed script execution engine includes:
      means for executing in the computing device concurrent with the execution of the HTML document scanner and the script execution engine;
      means for selecting operations in the discovered script that are relevant to discovering external resources; and
      means for executing only the selected operations to discover resources that are not expressly referenced in the discovered script or in the HTML document;
   means for pre-fetching resources by the sandboxed script execution engine issuing a request to a pre-fetcher to download the discovered resources that are not expressly referenced in the discovered script or in the HTML document, wherein pre-fetching the resources includes the sandboxed script execution engine pre-fetching a resource in parallel with the script execution engine executing a different script and concurrent with an execution of a browser operation; and means for discarding results generated via the sandboxed script execution engine executing the selected operations of the discovered script.

9. The computing device of claim 8, wherein means for executing only the selected operations to discover the resources that are not expressly referenced in the script or in the HTML document comprises means for executing at least one of the selected operations to discover a resource that is required to render the HTML document on an electronic display of the computing device.

10. The computing device of claim 8, wherein means for executing only the selected operations comprises means for executing at least one of the selected operations in parallel with an execution of a browser operation.

11. The computing device of claim 8, wherein means for executing only the selected operations comprises means for executing at least one of the selected operations in parallel with the script execution engine executing a different script and concurrent with an execution of a browser operation.

12. The computing device of claim 8, wherein means for executing only the selected operations comprises means for executing only the selected operations that correspond to a pattern identified as being relevant to discovering the external resources.

13. The computing device of claim 8, wherein means for executing only the selected operations comprises means for executing the selected operations based on heuristics.

14. The computing device of claim 8, further comprising: means for limiting a size of data structures generated from executing the selected operations.

15. A computing device, comprising:
a processor configured with processor-executable instructions to perform operations comprising:
scanning an HTML document to discover a script by an HTML document scanner;
invoking a script execution engine and spawning a sandboxed script execution engine in response to the HTML document scanner discovering the script, wherein:
the script execution engine:
commences compiling and executing the discovered script on the computing device concurrent with execution of the HTML document scanner and the sandboxed script execution engine; and
the sandboxed script execution engine:
executes concurrent with the execution of the HTML document scanner and the script execution engine;
selects operations in the discovered script that are relevant to discovering external resources;
executes only the selected operations to discover resources that are not expressly referenced in the discovered script or in the HTML document;
pre-fetching resources by the sandboxed script execution engine issuing a request to a pre-fetcher to download the discovered resources that are not expressly referenced in the discovered script or in the HTML document, wherein pre-fetching the resources includes the sandboxed script execution engine pre-fetching a resource in parallel with the script execution engine executing a different script and concurrent with an execution of a browser operation; and
discarding results generated via the sandboxed script execution engine executing the selected operations of the discovered script.

16. The computing device of claim 15, wherein the processor is configured with processor-executable instructions to perform operations such that the sandboxed script execution engine executes at least one of the selected operations to discover a resource that is required to render the HTML document on an electronic display of the computing device.

17. The computing device of claim 15, wherein the processor is configured with processor-executable instructions to perform operations such that the sandboxed script execution engine executes at least one of the selected operations in parallel with an execution of a browser operation.

18. The computing device of claim 15, wherein the processor is configured with processor-executable instructions to perform operations such that the sandboxed script execution engine executes at least one of the selected operations in parallel with executing other scripts and concurrent with an execution of a browser operation.

19. The computing device of claim 15, wherein the processor is configured with processor-executable instructions to perform operations such that the sandboxed script execution engine executes only the selected operations that correspond to a pattern identified as being relevant to discovering the external resources.

20. The computing device of claim 15, wherein the processor is configured with processor-executable instructions to perform operations such that the sandboxed script execution engine executes the selected operations based on heuristics.

21. The computing device of claim 15, wherein the processor is configured with processor-executable instructions to perform operations further comprising:
limiting a size of data structures generated from executing the selected operations.

22. A non-transitory computer readable storage medium having stored thereon processor-executable software instructions configured to cause a processor in a computing device to perform operations comprising:
scanning an HTML document to discover a script by an HTML document scanner;
invoking a script execution engine and spawning a sandboxed script execution engine in response to the HTML document scanner discovering the script, wherein:
the script execution engine:
commences compiling and executing the discovered script on the computing device concurrent with execution of the HTML document scanner and the sandboxed script execution engine; and
the sandboxed script execution engine:
executes concurrent with the execution of the HTML document scanner and the script execution engine;
selects operations in the discovered script that are relevant to discovering external resources;
executes only the selected operations to discover resources that are not expressly referenced in the discovered script or in the HTML document;
pre-fetching resources by the sandboxed script execution engine issuing a request to a pre-fetcher to download the discovered resources that are not expressly referenced in the discovered script or in the HTML document, wherein pre-fetching the resources includes the sandboxed script execution engine pre-fetching a resource in parallel with the script execution engine executing a different script and concurrent with an execution of a browser operation; and discarding results generated via the sandboxed script execution engine executing the selected operations of the discovered script.

23. The non-transitory computer readable storage medium of claim 22, wherein the stored processor-executable software instructions are configured to cause a processor to perform operations such that the sandboxed script execution engine executes at least one of the selected operations to discover a resource that is required to render the HTML document on an electronic display.

24. The non-transitory computer readable storage medium of claim 22, wherein the stored processor-executable software instructions are configured to cause a processor to perform operations such that the sandboxed script execution engine executes at least one of the selected operations in parallel with an execution of a browser operation.

25. The non-transitory computer readable storage medium of claim 22, wherein the stored processor-executable software instructions are configured to cause a processor to perform operations such that the sandboxed script execution engine executes at least one of the selected operations in parallel with the script execution engine executing a different script and concurrent with an execution of a browser operation.

26. The non-transitory computer readable storage medium of claim 22, wherein the stored processor-executable software instructions are configured to cause a processor to perform operations such that the sandboxed script execution engine executes only the selected operations that correspond to a pattern identified as being relevant to discovering the external resources.

27. The non-transitory computer readable storage medium of claim 22, wherein the stored processor-executable software instructions are configured to cause a processor to perform operations such that the sandboxed script execution engine executes the selected operations based on heuristics.

28. The non-transitory computer readable storage medium of claim 22, wherein the stored processor-executable software instructions are configured to cause a processor to perform operations further comprising:

limiting a size of data structures generated from executing the selected operations.

* * * * *